(12) United States Patent
Tanaka et al.

(10) Patent No.: US 8,511,696 B2
(45) Date of Patent: Aug. 20, 2013

(54) SUB-FRAME STRUCTURE OF VEHICLE AND MANUFACTURING METHOD THEREOF

(75) Inventors: Masaaki Tanaka, Hiroshima (JP); Osamu Kuratomi, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/636,289

(22) PCT Filed: Mar. 30, 2011

(86) PCT No.: PCT/JP2011/001889
§ 371 (c)(1), (2), (4) Date: Sep. 20, 2012

(87) PCT Pub. No.: WO2011/122012
PCT Pub. Date: Oct. 6, 2011

(65) Prior Publication Data
US 2013/0009375 A1    Jan. 10, 2013

(30) Foreign Application Priority Data
Mar. 30, 2010 (JP) ................................. 2010-077382

(51) Int. Cl.
*B60G 7/02* (2006.01)
(52) U.S. Cl.
USPC .................................................. 280/124.109
(58) Field of Classification Search
USPC ...... 280/124.109, 784, 785, 788; 296/187.09, 296/193.01, 193.09, 198, 203.2
See application file for complete search history.

(56) References Cited

U.S. PATENT DOCUMENTS

| 4,826,203 | A | * | 5/1989 | Kijima et al. | 280/124.109 |
| 6,755,429 | B1 | * | 6/2004 | Buchwitz et al. | 280/124.109 |
| 7,926,846 | B2 | * | 4/2011 | Tanaka et al. | 280/781 |
| 8,025,313 | B2 | | 9/2011 | Tanaka et al. | |
| 2009/0243271 | A1 | * | 10/2009 | Tanaka et al. | 280/781 |
| 2009/0243272 | A1 | | 10/2009 | Tanaka et al. | |

FOREIGN PATENT DOCUMENTS

| JP | 2006-347338 A | 12/2006 |
| JP | 2009-255902 A | 11/2009 |
| JP | 2010-030533 A | 2/2010 |

OTHER PUBLICATIONS

International Search Report; PCT/JP2011/001889; May 24, 2011.

* cited by examiner

*Primary Examiner* — Faye M. Fleming
(74) *Attorney, Agent, or Firm* — Studebaker & Brackett PC

(57) ABSTRACT

A sub-frame (1) of an automobile includes a pair of a front width direction member (2) and a rear width direction member (3) extending in a vehicle width direction, a pair of front-back direction members (4, 5) extending in a vehicle front-back direction, connecting members (6, 7) for connecting between a lower arm supporting part (11) of the front width direction member (2) and the rear width direction member (3), and a pair of linking brackets (8, 9) for respectively linking between an upper arm supporting part (10) of the front width direction member (2) and the pair of front-back direction members (4, 5). According to this, it is possible to achieve weight saving while maintaining rigidity in the front-back direction.

14 Claims, 17 Drawing Sheets

SUB-FRAME STRUCTURE OF VEHICLE AND MANUFACTURING METHOD THEREOF

TECHNICAL FIELD

The present invention relates to a sub-frame structure of a vehicle provided with a pair of width direction members at the front and rear thereof.

BACKGROUND ART

A multilink-type suspension having three or more suspension arms has been broadly used from the past in vehicles such as automobiles, and various structures have been proposed as a sub-frame structure for supporting the suspension arms.

For example, with the sub-frame structure described in Japanese Patent Application Laid-open No. 2006-347338 (Patent Document 1), separate brackets for supporting a total of five suspension arms are respectively provided on both left and right ends of a suspension cross member configured from a pair of cross members extending in a vehicle width direction and a pair of side members extending in a vehicle front-back direction. However, since numerous parts are used in this structure, there is a problem in that it is difficult to improve weight saving and productivity.

As a structure for resolving the foregoing problem, with the structure described in Japanese Patent Application Laid-open No. 2009-255902 (Patent Document 2), an upper arm supporting part and a lower arm supporting part are integrally formed with a front width direction member, and, by directly mounting the respective suspension arms on these supporting parts, reduction in the number of parts and weight saving are obtained.

In order to increase the rigidity of the sub-frame in the front-back direction, the structure described in Patent Document 2 comprises an inclination reinforcing member for connecting the upper arm supporting part and the lower arm supporting part of the front width direction member to the intermediate part of the rear width direction member.

This inclination reinforcing member basically supports the entire front width direction member. Specifically, the inclination reinforcing member reinforces the rigidity of the sub-frame in the front-back direction by covering, at both left and right ends in the vehicle width direction, a range from a top end of the upper arm supporting part to a bottom end of the lower arm supporting part of the front width direction member.

However, with the foregoing structure described in Patent Document 2, since the inclination reinforcing member covers a range from the top end of the upper arm supporting part to the bottom end of the lower arm supporting part of the front width direction member in order to reinforce the rigidity of the sub-frame in the front-back direction, the size and weight of the inclination reinforcing member inevitably increases. Thus, it is difficult to achieve the weight saving of the sub-frame. Meanwhile, if the size of the inclination reinforcing member is reduced, there is a problem in that it becomes difficult to maintain the rigidity of the sub-frame in the front-back direction.

SUMMARY OF INVENTION

The present invention was devised in view of the foregoing circumstances. Thus, an object of this invention is to provide a sub-frame structure of a vehicle capable of achieving weight saving while maintaining the rigidity of the sub-frame in the front-back direction.

In order to achieve the foregoing object, the sub-frame structure of a vehicle according to the present invention is a sub-frame structure of a vehicle for supporting a suspension arm of a multilink-type suspension, comprising:

a first width direction member extending in a vehicle width direction and having an upper arm supporting part and a lower arm supporting part which are vertically separated from each other at both left and right ends;

a second width direction member provided spaced from the first width direction member in a vehicle front-back direction and extending in the vehicle width direction;

a pair of front-back direction members extending in the vehicle front-back direction and mounted between the upper arm supporting part and the lower arm supporting part while respectively connecting left-side ends and right-side ends of the first and second width direction members;

at least one connecting member for connecting at least one of the lower arm supporting part of the first width direction member and a vicinity portion thereof with the second width direction member; and a pair of linking parts for respectively linking at least one of the upper arm supporting part of the first width direction member and a vicinity portion thereof with the pair of front-back direction members, the linking parts being spaced from the second width direction member forward in the vehicle front-back direction.

BRIEF DESCRIPTION OF DRAWINGS

FIG. 1 is a front view of a sub-frame structure for a 2WD according to the first embodiment of the sub-frame structure of a vehicle according to the present invention.
FIG. 2 is a rear view of the sub-frame structure shown in FIG. 1.
FIG. 3 is a bottom view of the sub-frame structure shown in FIG. 1.
FIG. 4 is a right-side view of the sub-frame structure shown in FIG. 1.
FIG. 5 is an exploded perspective view of an intermediate body configured from the front width direction member and the rear width direction member shown in FIG. 1, and connecting members positioned therebetween.
FIG. 6 is an exploded perspective view of the intermediate body shown in FIG. 5, and a pair of front-back direction members and a pair of linking brackets.
FIG. 7 is a top view of the sub-frame structure shown in FIG. 1 obtained by connecting the intermediate body shown in FIG. 5, and the pair of front-back direction members and the pair of linking brackets.
FIG. 8 is an enlarged perspective view of the vicinity of the linking bracket shown in FIG. 1.
FIG. 9 is a IV-IV cross section of FIG. 8.

FIG. 10 is an explanatory diagram of a cross section showing the operation of performing the provisional spot welding of the front width direction member shown in FIG. 1.

FIG. 11 is a perspective view showing a state of mounting a rear differential support bracket on a sub-frame structure in a sub-frame structure for a 4WD according to the second embodiment of the sub-frame structure of a vehicle according to the present invention.

FIG. 12 is a bottom view of the sub-frame structure shown in FIG. 11.

FIG. 13 is a front view of the sub-frame structure shown in FIG. 11.

FIG. 14 is an enlarged cross section of the vicinity of the connection part of the rear width direction member and the front-back direction member shown in FIG. 13.

FIG. 15 is a view illustrating the connection part of the connecting member shown in FIG. 13 from a lower oblique angle.

FIG. 16 is a front view of a sub-frame structure for a 4WD using a separate upper arm supporting part according to the third embodiment of the sub-frame structure of a vehicle according to the present invention.

FIG. 17 is a right-side view of the sub-frame structure shown in FIG. 16.

FIG. 18 is an enlarged view showing a structure wherein a positioning hole separate from an arm bearing hole is provided on a front width direction member according to a variation of the sub-frame structure of a vehicle according to the present invention.

DESCRIPTION OF EMBODIMENTS

Embodiments of the sub-frame structure of a vehicle according to the present invention are now explained in detail with reference to the attached drawings.

(First Embodiment)

Figure 3:
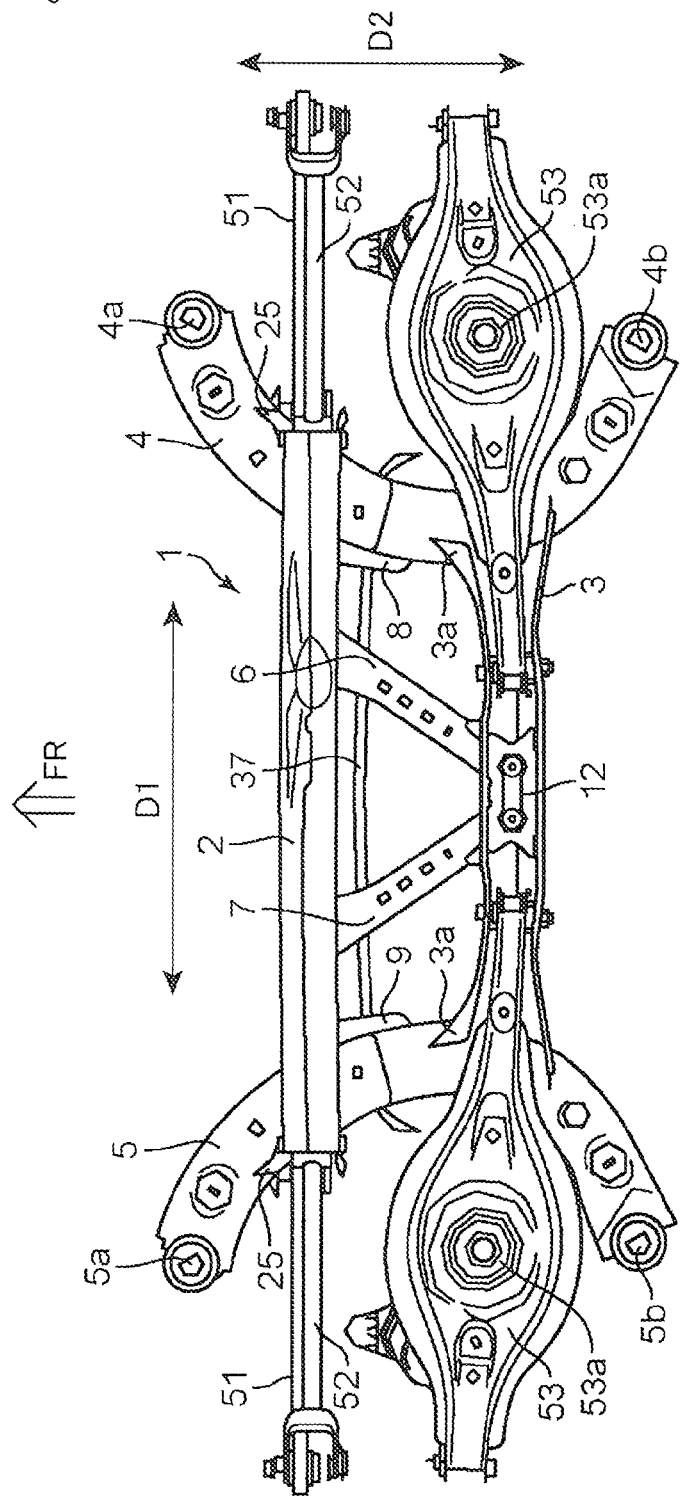
[FIG. 3]

A sub-frame 1 as an embodiment of the sub-frame structure of a vehicle according to the present invention shown in FIGS. 1 to 4 configures a sub-frame for supporting a rear part of a body of a front engine front drive (FF) automobile among two-wheel drive (2WD) automobiles. Note that the arrow FR in FIG. 3 shows the forward direction of the vehicle (hereinafter the same).

The sub-frame 1 comprises a front width direction member 2 (first width direction member) and a rear width direction member 3 (second width direction member), a pair of front-back direction members 4, 5 connected to both left and right ends thereof, a pair of connecting members 6, 7, and a pair of linking brackets 8, 9.

Moreover, a multilink suspension mechanism 50 is supported with the sub-frame 1. The multilink suspension mechanism 50 is a multilink-type suspension having a plurality of suspension arms, and respectively comprises a pair of upper suspension arms 51, lower suspension arms 52, rear lower arms 53, springs 54 and dampers 55 at the left and right ends of the sub-frame 1.

The front width direction member 2 is a member extending in the vehicle width direction D1 (refer to FIG. 1), includes an upper arm supporting part 10 and a lower arm supporting part 11 which are vertically separated from each other at both left and right ends, and has an approximate X shape.

An inner end of the upper suspension arm 51 (end on the sub-frame 1 side) is swingably supported vertically in an arm bearing hole 10a of the upper arm supporting part 10 with a bolt or the like. Meanwhile, an inner end of the lower suspension arm 52 is swingably supported vertically in an arm bearing hole 11a of the lower arm supporting part 11 with a bolt or the like.

Respective outer ends (ends on the side opposite to the sub-frame 1) of the upper suspension arm 51 and the lower suspension arm 52 swingably support, in the vertical direction, a supporting member S for rotatably supporting a wheel W.

The rear width direction member 3 is a member extending in the vehicle width direction D1 (refer to FIG. 2), and is provided spaced from the front width direction member 2 in the vehicle front-back direction.

A pair of rear lower arms 53 extending in the vehicle width direction D1 is swingably supported vertically by the rear width direction member 3 with a bolt or the like. Moreover, a reinforcement bracket 12 (refer to FIG. 3) is welded near the center on the lower surface side of the rear width direction member 3.

An outer end of the rear lower arm 53 is mounted on the supporting member S, and an inner end thereof is mounted on the rear width direction member 3. The spring 54 is mounted on the rear lower arm 53. A lower end of the spring 54 is received by a spring bearing 53a of the rear lower arm 53, and an upper end thereof is mounted on a vehicle body (not shown). Meanwhile, a lower end of the damper 55 is directly mounted on the supporting member S, and an upper end thereof is mounted on a vehicle body (not shown).

The pair of front-back direction members 4, 5 are members extending in the vehicle front-back direction D2 (refer to FIG. 3) and mounted between the upper arm supporting part 10 and the lower arm supporting part 11 while respectively connecting left-side ends and right-side ends of the front width direction member 2 and the rear width direction member 3.

The front-back direction members 4, 5 are joined to the front width direction member 2 in a state of being inserted into a concave part 31 formed between the upper arm supporting part 10 and the lower arm supporting part 11 in the front width direction member 2, and the front-back direction members 4,5 are also joined to the rear width direction member 3 in a state of being inserted into a concave part 32 formed at either end of the rear width direction member 3.

Mount parts 4a, 4b, 5a, 5b are respectively provided to the front ends and rear ends of the front-back direction members 4, 5. The sub-frame 1 is mounted on the vehicle body (not shown) via the mount parts 4a, 4b, 5a, 5b.

Figure 4:
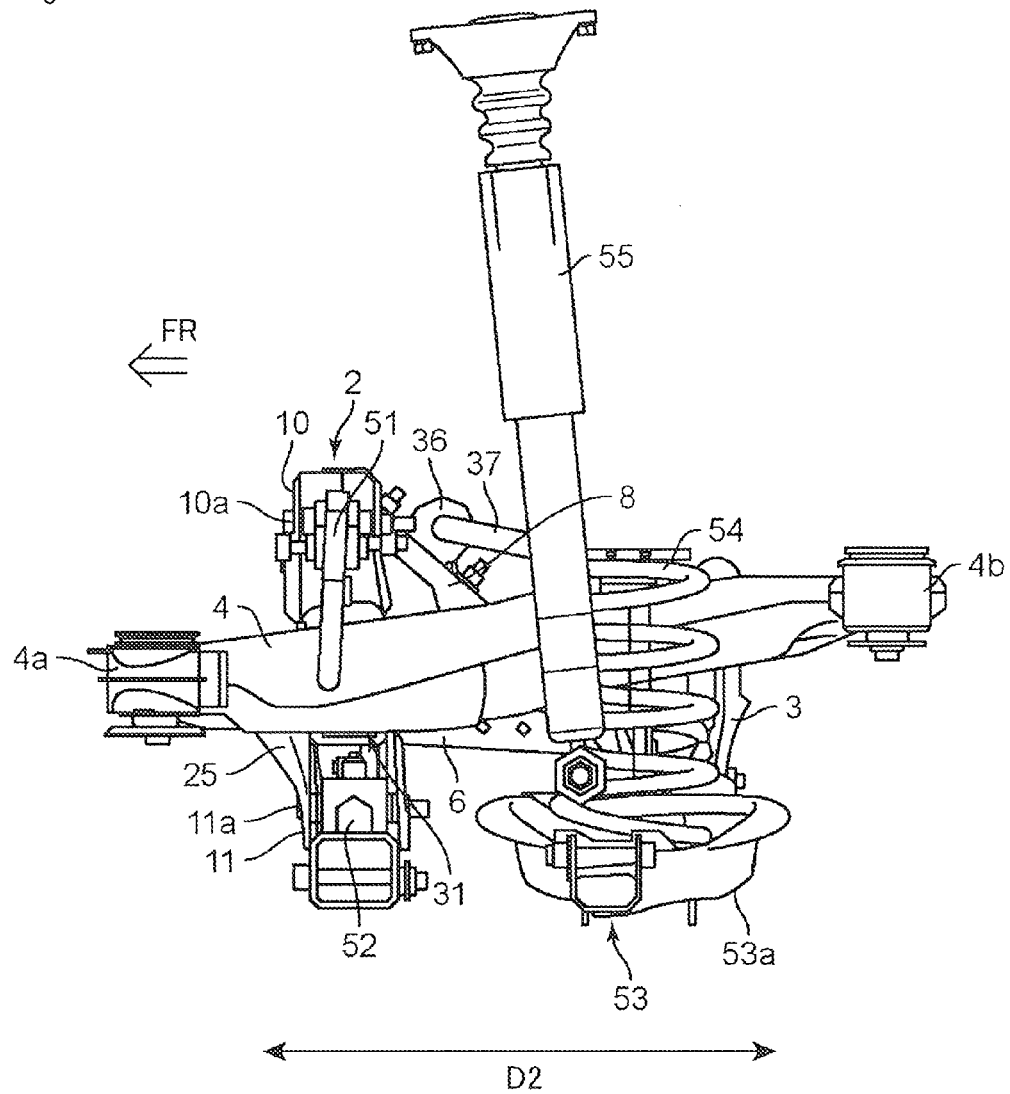
[FIG. 4]

Moreover, as shown in FIG. 4, the connecting region, of the front-back direction members 4, 5, where the front-back direction members 4, 5 are connected with the upper arm supporting part 10, is slanted rearward, that is, toward the rear width direction member 3 (upper right in FIG. 4). According to this configuration, the longitudinal wall on the rear side of the upper arm supporting part 10 becomes shorter in the vertical direction in comparison to the longitudinal wall on the front side, and the rigidity against the load in a direction of slanting the upper arm supporting part 10 toward the side of the rear width direction member 3 in the front-back direction of the sub-frame 1 is improved.

Moreover, as shown in FIGS. 3 to 7, the pair of connecting members 6, 7 connect between the lower arm supporting part 11 on the left and right sides of the front width direction member 2 or the vicinity portion thereof and the intermediate portion of the rear width direction member 3. Note that the connecting members 6, 7 may also connect both the lower arm supporting part 11 and the vicinity portion thereof with the intermediate portion of the rear width direction member 3.

Although the front width direction member 2 and rear width direction member 3 are easily subject to a load at the bottom parts thereof, the rigidity in the front-back direction is improved since the bottom parts thereof are partially connected firmly with the pair of connecting members 6, 7.

Moreover, the connecting members 6, 7 are disposed at a slant inwardly in the vehicle width direction when viewed in the vehicle width direction D1 of FIG. 3. Specifically, the connecting members 6, 7 are disposed so that the spacing at the linking portion with the front width direction member 2 is wide and the spacing at the linking portion with the rear width direction member 3 is narrow. Consequently, the load when the automobile is turning can be effectively received at the lower part of the sub-frame 1 where the load is concentrated.

Here, it is preferable that a connecting portion of the front width direction member 2 with the connecting members 6,7 are positioned nearer to the arm bearing hole 11a of the lower arm supporting part 11, so that the load when the vehicle is turning can be more effectively transferred from the lower arm supporting part 11 to the rear width direction member 3. Note that simulations and experiments by inventors et al. proved the effect of transferring the load when the vehicle is turning from the lower arm supporting part 11 to the rear width direction member 3 via the connecting members 6,7 sufficiently in an area in the vicinity of the lower arm supporting part 11 in which a distance between the arm bearing hole 11a and the connecting portion with the connecting member 6 or 7 is shorter than a distance between both the connecting portions with the left and right connecting member 6 and 7, Furthermore, as shown in FIGS. 1 to 4 and FIGS. 6 to 8, the pair of linking brackets 8, 9 respectively link between the upper arm supporting part 10 of the front width direction member 2 or the vicinity portion thereof and the front-back direction members 4, 5. Note that the linking brackets 8, 9 may also link both the upper arm supporting part 10 and the vicinity portion thereof with the front-back direction members 4, 5.

The linking brackets 8, 9 are members that are shorter and lighter than the connecting members 6, 7. The linking brackets 8, 9 diagonally link between the upper arm supporting part 10 and the front-back direction members 4, 5 disposed the vicinity of the upper arm supporting part 10 with a distance shorter than lengths of the connecting members 6, 7. Thus, since the linking brackets 8, 9 are shorter than the connecting members 6, 7, the desired bend rigidity can be obtained using a material with lower rigidity. Accordingly, thinning and weight saving can be achieved, and costs can be reduced by using an inexpensive material.

On the other hand, since the linking brackets 8, 9 are shorter than the connecting members 6, 7, weight saving or inhibiting of weight increasing can be achieved with enhancing rigidity by becoming the connecting brackets thicker than the connecting members. This is preferable for raising coupling strength when a coupling part is provided separately from the connecting bracket, as described after.

Figure 6:
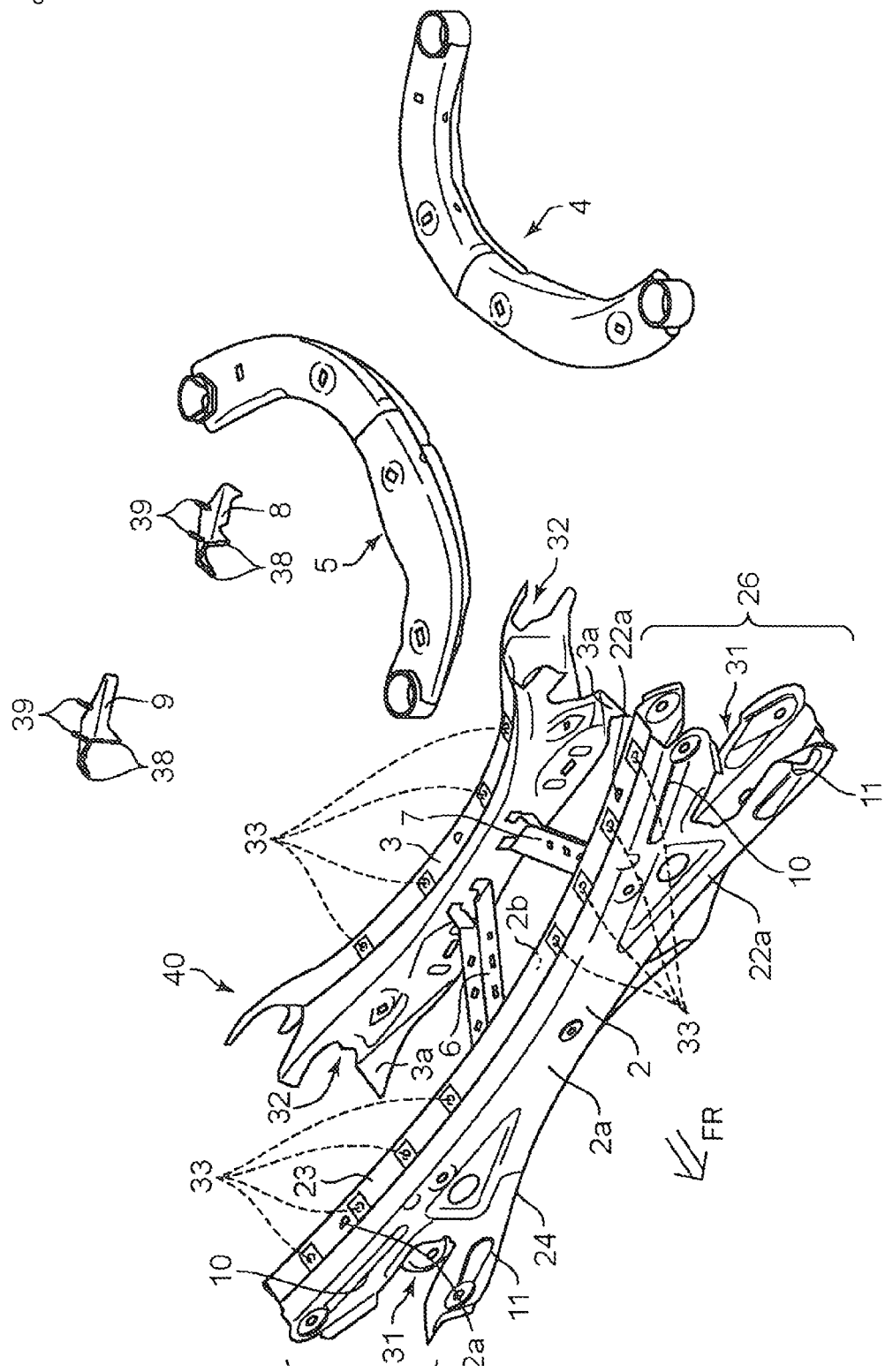
[FIG. 6]
Figure 7:
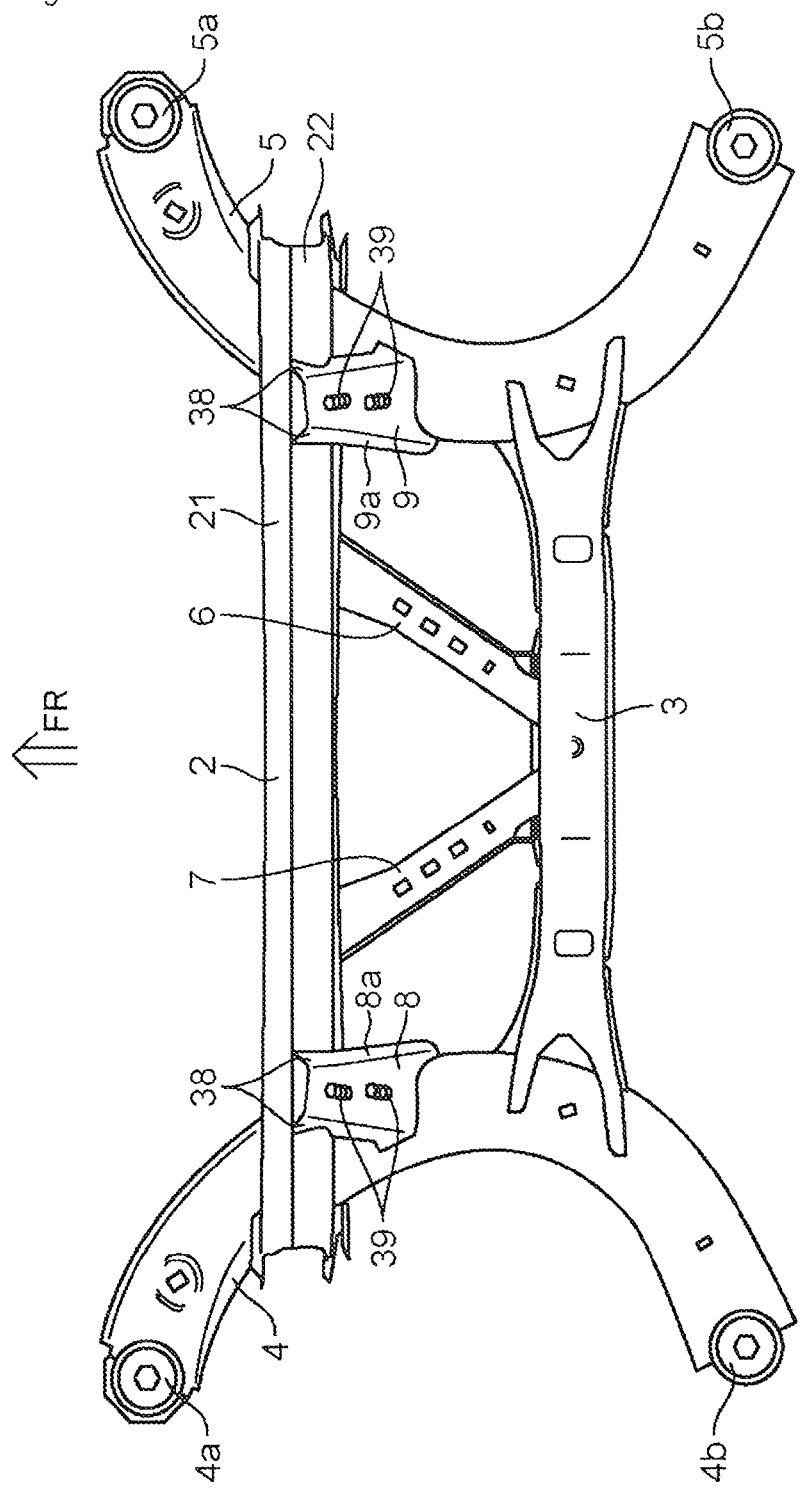
[FIG. 7]
Figure 8:
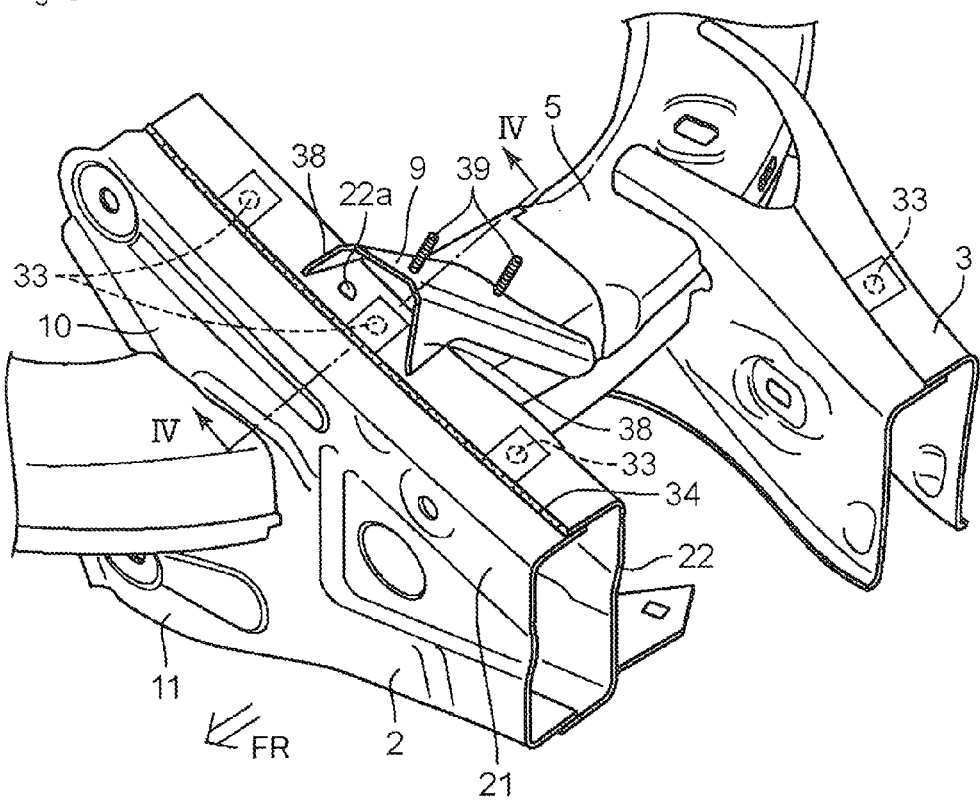
[FIG. 8]

Moreover, as shown in FIGS. 6 to 8, a triangular claw-shaped protrusion 38 is formed respectively at the front side of the linking brackets 8, 9.

In addition, as shown in FIG. 6, the protrusion 38 provided outward in the vehicle width direction is formed in a shape along the top face and rear face of the front width direction member 2. Moreover, as shown in FIG. 7, the rear side portion of the linking brackets 8, 9 is formed in a shape of being linked to the top face of the front-back direction members 4, 5 and the side face inward in the vehicle width direction.

According to this configuration, since the joining area will enlarge upon welding the rear side of the front width direction member 2 and the front-back direction members 4, 5, the rigidity in the vehicle front-back direction is further improved.

Moreover, as a result of the joining area of the protrusion 38 provided outward in the vehicle width direction on the front side of the linking brackets 8, 9 and the front-side width direction member 2 increasing, and the joining area of the rear side portion of the linking brackets 8, 9 and the side face of the front-back direction members 4, 5 inward in the vehicle width direction increasing, the linking brackets 8, 9 can more easily transfer the load in a direction toward the rear of the vehicle and inward in the vehicle width direction.

Preferably, inside portions 8a, 9a of the linking brackets 8, 9 in the vehicle width direction extends at a slant inwardly in the vehicle width direction from the front width direction member 2 to the rear width direction member 3. Thereby, the linking brackets 8, 9 can transfer the load rearward of the vehicle and inward in the vehicle width direction more easily In addition, end portions 3a (as shown in FIG. 3 and FIG. 6) of a front wall of the rear vehicle width direction member 3 extends at a slant outwardly in the vehicle width direction toward the front width direction member 2. The end portions 3a are connected with the front-back direction members 4, 5. Thereby, the load can be easily diffused to the rear width direction member 3 from the connecting brackets 8, 9 via the front-back direction members 4, 5 rearward of the vehicle and inward in the vehicle width direction.

In addition, the top face of the linking brackets 8, 9 is provided with a stabilizer attaching part for attaching a stabilizer 35. Specifically, with the sub-frame 1 of this embodiment, a stud bolt 39 is provided as the stabilizer attaching part. A bracket 36 (refer to FIG. 2 and FIG. 4) for rotatably mounting a bar 37 of the stabilizer 35 is fixed via the stud bolt 39.

Note that the stabilizer attaching part is not limited to a stud bolt, and an attachment member like a bolt, a rivet, a fastener or the like may be provided, or only a through-hole for attachment portion on the side of the stabilizer may be provided, or a welding nut may be provided.

According to the foregoing configuration, the vicinity of the lower arm supporting part 11 configuring the lower side of the front width direction member 2 where the load is concentrated is firmly connected to the rear width direction member with connecting members 6, 7 in order to improve the rigidity in the front-back direction. In addition, the short distance (distance that is much shorter than lengths of the connecting members 6, 7) between the vicinity of the upper arm supporting part 10 configuring the upper side of the front width direction member 2 and the front-back direction members 4, 5 disposed in the vicinity of upper arm supporting part 10 which are relatively free from being subject to a load in comparison to the lower side of the front width direction member 2 is connected with the linking brackets 8, 9.

Consequently, it is possible to optimize the structure relative to the size of the load, and thereby improve the rigidity in the front-back direction and achieve weight saving.

Moreover, with the structure of supporting the upper side of the front width direction member 2 with the linking brackets 8, 9, the structure can be simplified, and weight saving and productivity can be improved.

Figure 5:
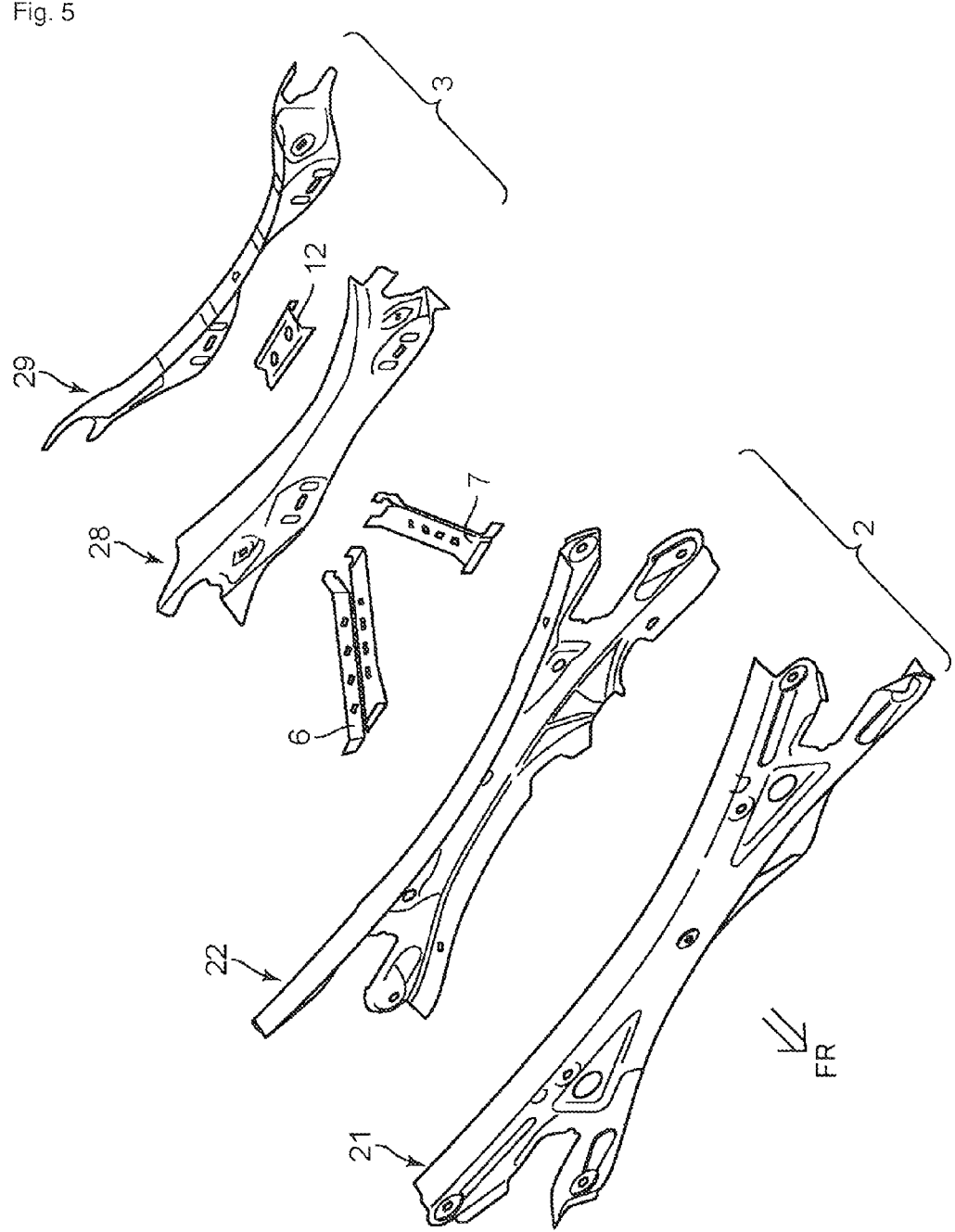
[FIG. 5]

Moreover, as shown in FIGS. 5 and 6, the front width direction member 2 is a hollow body obtained by joining and combining the vicinity of the mutual edges of the pair of U-shaped cross section panels 21, 22 extending in the vehicle width direction. Specifically, as shown in FIG. 6, a continuous opening 26 is formed on the outside of the vehicle width direction of the upper arm supporting part 10 and the lower arm supporting part 11. In addition, a front face 2a and a rear face 2b of the intermediate portion of the front width direction member 2 have a closed plane, and the pair of U-shaped cross section panels 21, 22 are subject to continuous welding after its upper face 23 and lower face 24 are mutually welded provisionally with spot welding. Similarly, the rear width direction member 3 is formed in a hollow body shape by joining two panels 28, 29. The continuous welding is a welding method of continuously welding the welding locations extending linearly, and, for example, arc welding using electrodes such as a welding rod or a wire, plasma welding, laser welding or seam welding can be adopted. The same applies to the continuous welding described later.

According to the foregoing configuration, since the front width direction member 2 and the rear width direction member 3 are hollow bodies and the front face 2a and the rear face 2b of the intermediate portion thereof have a closed plane, the center part becomes rigid and weight saving can be achieved.

Figure 10:
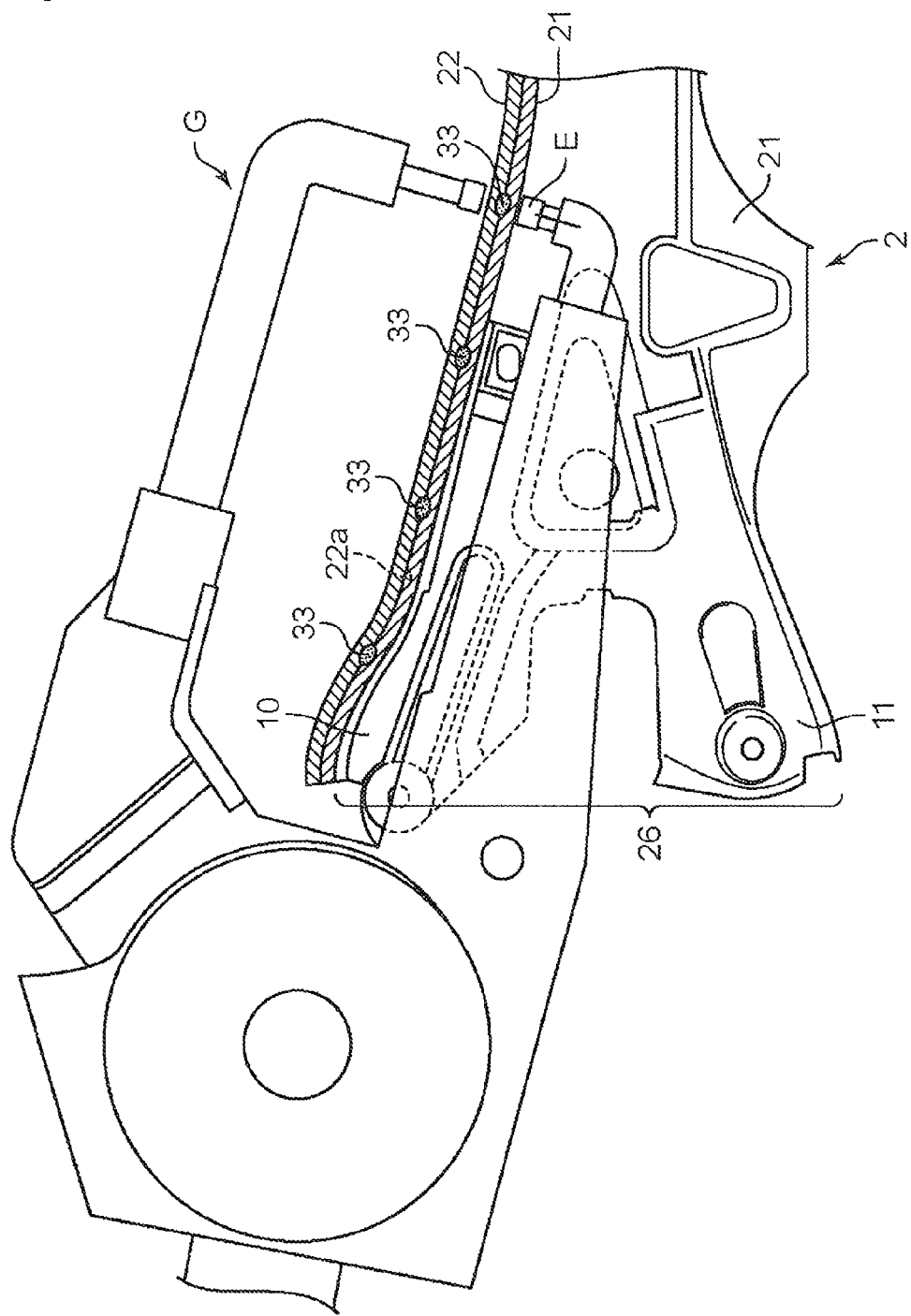
[FIG. 10]

In addition, both ends of the front width direction member 2 are able to broadly form the opening 26 continuously from the upper arm supporting part 10 to the lower arm supporting part 11 on the outside of the vehicle width direction. Thus, as shown in FIG. 10, an electrode E of a welding gun G for performing provisional spot welding can be inserted into the opening 26 for performing provisional spot welding up to the vicinity of the center part in the vehicle width direction. Moreover, FIG. 10 shows a plurality of spot welding portions 33 at the portion where the panels 21, 22 are superposed.

Figure 9:
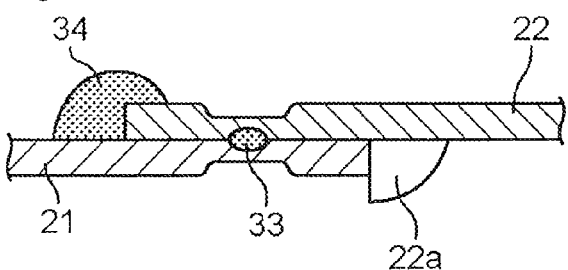
[FIG. 9]

Here, as shown in FIGS. 8 and 9, the spot welding portions 33 for provisional joining are formed near the location where the tip of the panel 21 comes in contact with a cut-and-raised portions 22a of the panel 22 among the portions where the edges of the panels 21, 22 configuring the front width direction member 2 are superposed. Here, the cut-and-raised portions 22a correspond to the positioning projection of the present invention, and is provided to one panel 22, and restricts the movement of the other panel 21 in the approaching direction. Moreover, the cut-and-raised portions 22a are located in the vicinity of the linking brackets 8, 9. Preferably, the cut-and-raised portions 22a are located in an area in which the connecting brackets 8, 9 and the cut-and-raised portions 22a are stacked with each other in the vehicle width direction or the cut-and-raised portions 22a are adjacent to the connecting brackets 8, 9. Meanwhile, the continuous welding portions 34 for firmly joining the panels 21 and 22 with continuous welding are formed near the tip of the panel 22 that is distant from the spot welding portions 33. According to this, it is possible to improve the joining strength as a result of the welding locations increasing while improving the productivity, reduce the gaps in the continuous welding portions and improve the quality of the continuous welding. In addition, since the continuous welding portion 34 is separated from the spot welding portions 33, thermal influence (deformation or deterioration in rigidity) to the panels 21, 22 is minimal even if provisional spot welding and subsequent continuous welding are performed.

Note that, as the provisional joining method, friction stir welding and various other joining methods may be adopted in addition to spot welding.

Moreover, since a flange-less structure of superposing and joining the front and rear panels 21, 22 is adopted, there is no need to provide a flange for welding, the section modulus can be improved, and the production yield of materials and weight saving can be improved.

In addition, with this embodiment, as shown in FIG. 8, since the cut-and-raised portions 22a and the spot welding portions 33 for positioning the front and rear panels 21, 22 are positioned in the vicinity of the linking brackets 8, 9 on either end, this contributes to transferring the load of the front panel 21 to the linking brackets 8, 9.

Note that the rear width direction member 3 is also manufactured according to the same welding method as the front width direction member 2.

Moreover, as shown in FIGS. 3 and 4, the front width direction member 2 includes flange parts 25 which bend and extend, in the vehicle front-back direction D2, to the opposite side relative to the rear width direction member 3 at the lower arm supporting part 11, and which are joined with the front-back direction members 4, 5.

According to the foregoing configuration, the front-back direction members 4, 5 can be supported with the flange parts 25, and, consequently, the rigidity of the front width direction member 2 in the front-back direction can be further improved without having to narrow the opening 26. In particular, if the flange parts 25 are provided at a slant in the same direction as the connecting members 6, 7 when viewed from the top of the flange parts 25, the load when the vehicle is turning can be smoothly transferred from the front-back direction members 4, 5 to the rear width direction member 3, and the rigidity can be improved preferably.

Figure 1:
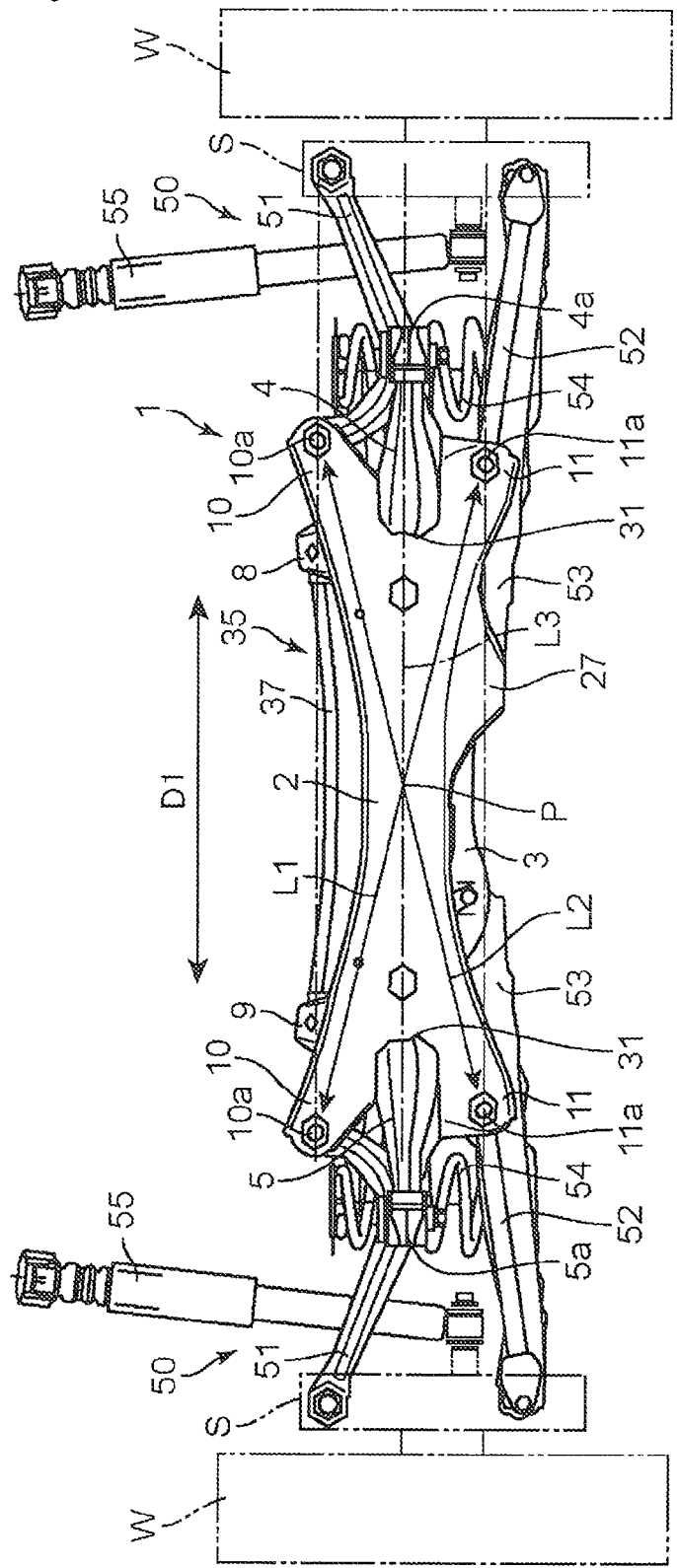
[FIG. 1]
Figure 2:
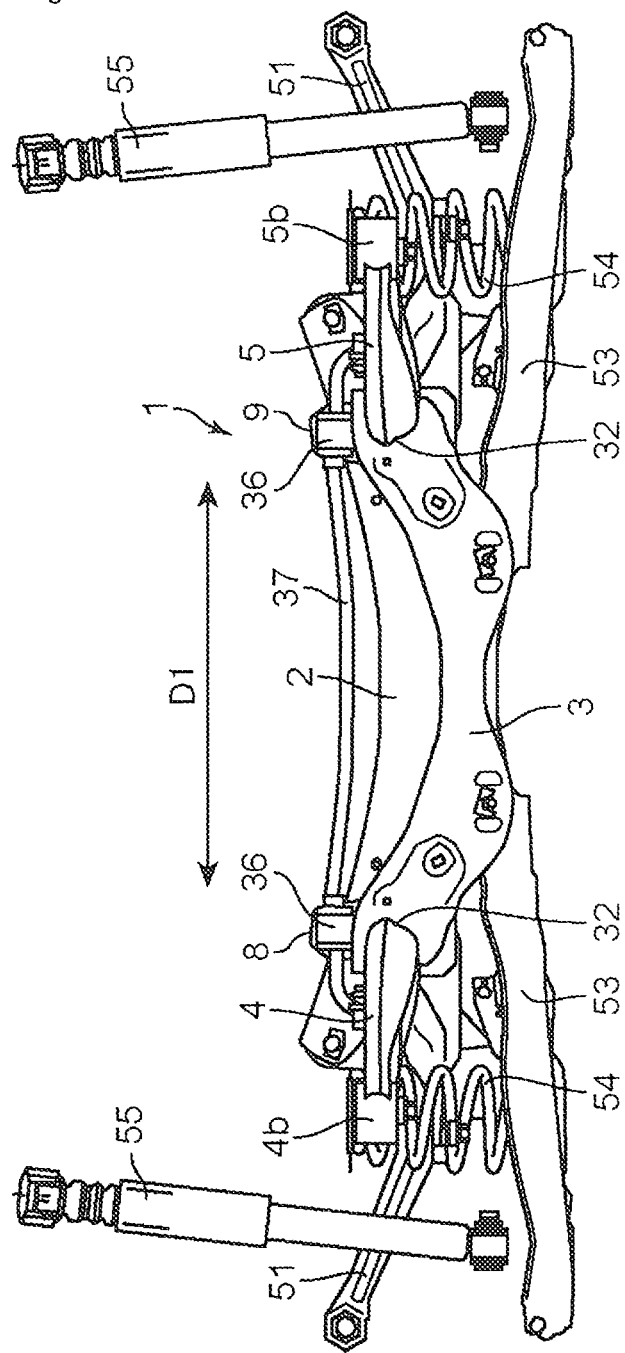
[FIG. 2]

Furthermore, as shown in FIG. 1, the front width direction member 2 has a structure of receiving the load approximately diagonally between the left-side upper arm supporting part 10 and the right-side lower arm supporting part 11, and receiving the load between the right-side upper arm supporting part 10 and the left-side lower arm supporting part 11 on the diagonal lines L1, L2 (so-called cross coupling structure). Note that reference numeral 27 in FIG. 1 is a lift-up point, and does not affect the foregoing cross coupling structure.

As a result of forming the front width direction member 2 in a cross coupling shape as described above, the rigidity of the vehicle width direction D1 can be improved. Specifically, during a right turn of a common grounding point, while a load that compresses the front width direction member 2 is applied to the left-side lower arm supporting part 11, a load that compresses the front width direction member 2 is also applied to the right-side upper arm supporting part 10 on the diagonal line L2. Moreover, while load that pulls the front width direction member 2 is applied to the left-side upper arm supporting part 10, a load that pulls the front width direction member 2 is also applied to the right-side lower arm supporting part 11 on the diagonal line L1. Since the front width direction member 2 receives the load on the diagonal lines L1, L2 against the foregoing load applied in the vehicle width direction, the front width direction member 2 can effectively receive the load applied to the left and right suspension arms 51, 52, and the left and right loads can thereby be effectively cancelled out.

Moreover, as shown in FIG. 1, preferably, an intersection point P of the diagonal lines L1 and L2 connecting the cross coupling in an X shape is positioned at the center of the front width direction member 2. Specifically, as the cross section center in the center part of the front width direction member 2, FIG. 1 shows a center line L3 passing through the intermediate position between the arm bearing hole 10a of the upper arm supporting part 10 and the arm bearing hole 11a of the lower arm supporting part 11 at the left and right ends of the front width direction member 2, and this center line L3 preferably passes through immediately above or near the intersection point P. According to this, it is possible to improve the rigidity in the vehicle width direction and the front-back direction.

With the sub-frame 1 of the foregoing embodiment, since the flange part 25 of the front width direction member 2 is slanted outwardly in the vehicle width direction, the rigidity against the load caused by the slanting of the front width direction member 2 in the vehicle width direction can be effectively improved with lightweight and minimal parts.

Furthermore, with the sub-frame 1 of the foregoing embodiment, since the linking brackets 8, 9 include the stud bolt 39 as the stabilizer attaching part, it is possible to reduce the number of parts and achieve weight saving and downsizing.

Furthermore, with the sub-frame 1 of the foregoing embodiment, a connecting region, of the front-back direction members 4, 5, where the front-back direction members 4, 5 are connected with the upper arm supporting part 10 of the front width direction member 2, is slanted so that the rear width direction member 3 side is on the upper side when viewed from the side of the connecting region. Thus, since the height of the longitudinal wall on the rear width direction member 3 side in the front width direction member 2 becomes shorter than the height of the longitudinal wall on the opposite side, the rigidity of the front width direction member 2 relative to the slanting direction toward the rear width direction member 3 side can be improved. Since the connecting members 6, 7 are reinforced relative to the opposite slant (that is, slanting direction toward the side that is opposite to the rear width direction member 3 side of the front width direction member 2), consequently, the front width direction member 2 becomes strong against the slant in both the front and back.

Furthermore, with the sub-frame 1 of the foregoing embodiment, the front width direction member 2 is formed in a closed cross section structure in which edges of the pair of approximately U-shaped cross section panels 21, 22 are mutually joined, and which continues in the vehicle width direction from an end in the vehicle width direction toward a center side by a predetermined distance. According to the foregoing structure, since a flange-less structure that does not require a flange for joining between the pair of approximately U-shaped cross section panels 21, 22 of the front width direction member 2 is adopted, the section modulus can be improved. In addition, since the front width direction member 2 is of a shape having the upper arm supporting part 10 and the lower arm supporting part 11 which are vertically separated from each other at both left and right ends, and is of a so-called diagonal line shape or X shape, the opening 26 at both left and right ends of the front width direction member 2 is broadened. Thus, a bifacial joining jig for spot welding or friction stir welding can be easily inserted from the opening 26 deep into the center side in the vehicle width direction.

Furthermore, with the sub-frame 1 of the foregoing embodiment, one panel 21 configuring the front width direction member 2 is provided with the cut-and-raised portions 22a as a positioning projection for restricting the movement of the other panel 22 in the approaching direction, and the cut-and-raised portions are in the vicinity of the linking brackets 8, 9. Thus, the cut-and-raised portion 22a are also caused to efficiently contribute to the transfer of the front-back load to the linking brackets 8, 9, and improvement in productivity and rigidity can be achieved simultaneously.

(Explanation of Manufacturing Method of Sub-Frame 1)

The method of manufacturing the sub-frame 1 of this embodiment is now explained.

Foremost, as shown in FIG. 5, the respective edges of the U-shaped cross section front panel 21 and rear panel 22 of the front width direction member 2 are supported by coming in contact with each other, and the front panel 28 and the rear panel 29 of the rear width direction member 3 are supported by coming in contact with each other. Here, the reinforcement bracket 12 is also supported by coming in contact with the lower face side of the rear width direction member 3. Subsequently, the front width direction member 2, the rear width direction member 3, and the connecting members 7, 8 are mutually supported by coming in contact with each other.

Here, since at least one of the arm bearing holes 10a, 11a of the respective arm supporting parts 10, 11 of the front width direction member 2 are used as the positioning holes of the front width direction member 2 during manufacture, error during the manufacture for the whole arm bearing holes 10a, 11a on the front width direction member 2 can thereby be reduced.

Figure 18:
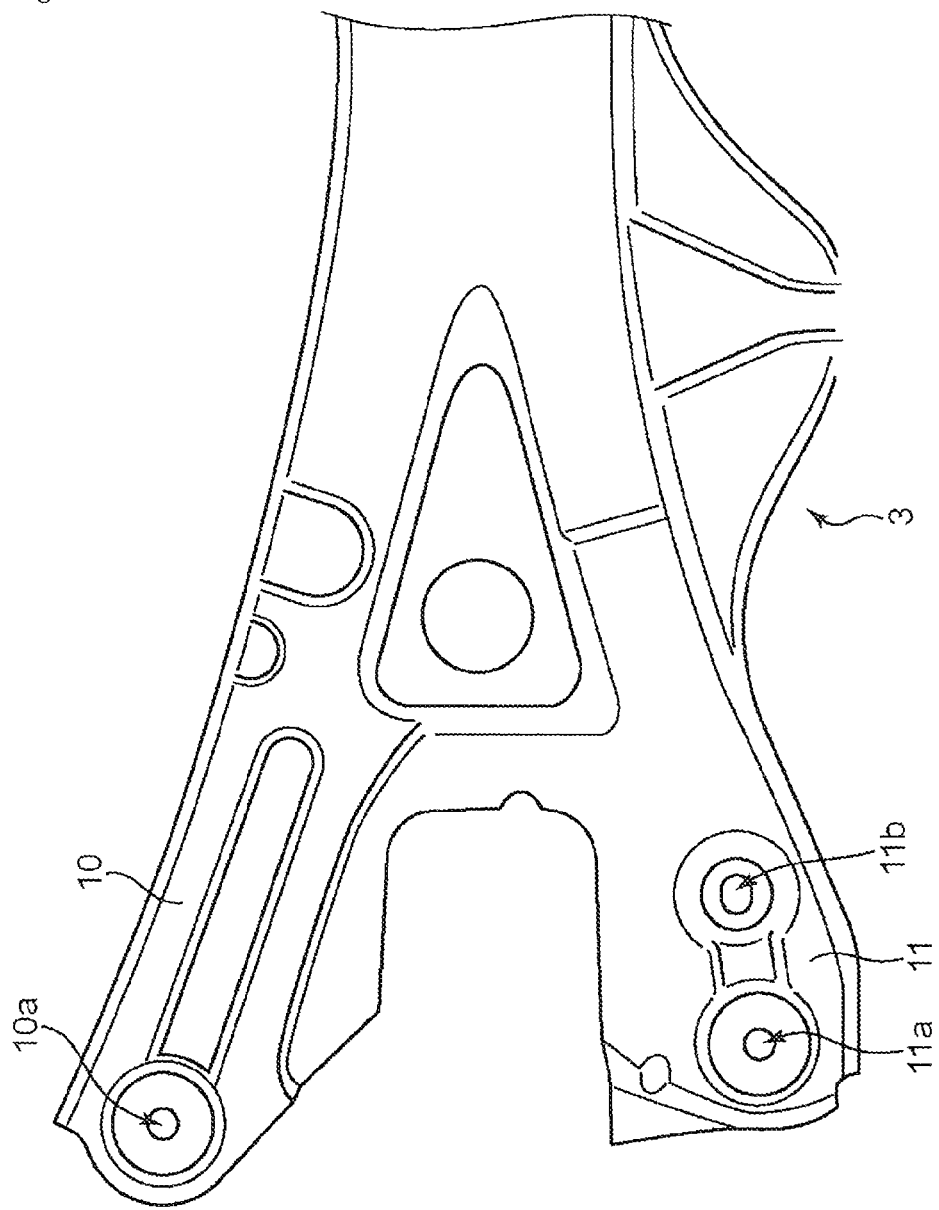
[FIG. 18]

Note that a positioning hole may be provided separately from the arm bearing holes 10a, 11a in order to commoditize a position of the positioning hole in view of commoditization of a manufacturing machine with allowing to change an arm bearing hole corresponding to various kinds of vehicles. In this case, it is preferable that the positioning hole is provided in at least one arm bearing portion in view of decreasing the error during the manufacture. For example, as shown in FIG. 18, a positioning hole 11b separate from the arm bearing hole 11a may be provided. The positioning hole 11b may be formed in the vicinity of the arm bearing hole 11a and inside of the arm bearing hole 11a in the vehicle width direction on the arm supporting parts 11 of the front width direction member 2.

Subsequently, as shown in FIG. 6, the respective members 2, 3, 6, 7 and spaces therebetween are collectively provisionally joined with spot welding in order to tack the intermediate body 40 (refer to FIG. 6) (provisional joining process).

Subsequently, as shown in FIG. 6, the continuous joining portions between the respective members 2, 3, 6, 7 are subject to continuous welding in order to form the intermediate body 40 (refer to FIG. 6) (intermediate body forming process).

Subsequently, a pair of left and right front-back direction members 4, 5 and linking brackets 8, 9 are positioned and provisionally fixed to the intermediate body 40.

Thereafter, the joining portions of the front-back direction members 4, 5 and the linking brackets 8, 9 and the intermediate body 40 are collectively subject to continuous welding (collective welding process). The sub-frame 1 is thereby completed.

Note that the front-back direction members 4, 5 are manufactured on a manufacturing line separate from a manufacturing line for the intermediate body 40 in parallel.

The front-back direction members 4, 5 in this embodiment are configured by plural panel members divided into four parts formed by dividing into two upper and lower parts and further dividing each of them into two parts in the vehicle front-back direction. The front-back direction members 4, 5 are formed in a closed cross section structure in which edges of these divided panels are mutually stacked and joined. Rigidity of coupling portions can be improved by coupling the above mentioned linking brackets 8, 9 with a portion in which front and rear panel members are mutually stacked.

Here, a form for dividing into plural panel members may be arranged appropriately. The front-back direction members 4, 5 are formed by upper and lower panel members. Further, the front-back direction members 4, 5 may be formed by pipe members or casting members or configured by assembling the pipe members and the casting members appropriately.

Based on the foregoing manufacturing method, it is possible to collectively assemble the intermediate body 40 based on provisional spot welding, considerably reduce the number of processes, and streamline the production line.

Specifically, with a conventional manufacturing method, the respective members 2, 3, 6, 7 were each subject to provisional spot welding and continuous welding to weld the individual members, and, subsequently, the spaces the members 2, 3, 6, 7 were subject to provisional spot welding and continuous welding in a mutual manner to manufacture the intermediate body 40, and, thereafter, the intermediate body 40 and the front-back direction members 5, 6 and the linking brackets 8, 9 were subject to continuous welding in a mutual manner. Thus, the processes required were extremely numerous.

Nevertheless, with the manufacturing method of the foregoing embodiment, since the members 2, 3, 6, 7 are collectively provisionally fixed with spot welding in the state of the intermediate body 40 and further collectively subject to continuous welding in order to form the intermediate body 40, it is possible to considerably reduce the number of processes and simplify the production line.

In addition, the possibility of the errors arising during the welding of the individual members 2, 3, 6, 7 being accumulated as the error of the overall sub-frame 1 can be reduced.

With the foregoing manufacturing method of the sub-frame 1, since the pair of approximately U-shaped cross section panels 21, 22 configuring the front width direction member 2, the panels 28, 29 configuring the rear width direction member 3, and the reinforcement bracket 12 and the connecting members 6, 7 are respectively positioned at predetermined positions and provisionally joined in a mutual manner and subsequently mutually welded to form the intermediate body 40, and the front-back direction members 4, 5 and the linking brackets 8, 9 are positioned at predetermined positions in the intermediate body 40, and the front-back direction member 4, 5 and the linking brackets 8, 9 and the intermediate body 40 are collectively welded at the joining parts thereof, it is possible to reduce the manufacture line and man-hours.

Furthermore, with the foregoing manufacturing method of the sub-frame 1, in the provisional joining process, since the arm bearing holes 10a, 11a for supporting the suspension arms 51, 52 in the respective arm supporting parts 10, 11 of the front width direction member 2 is used for positioning the front width direction member 2, reduction of holes for positioning the front width direction member 2 and improvement in the measurement accuracy can be simultaneously achieved.

Furthermore, with the foregoing manufacturing method of the sub-frame 1, since the front width direction member 2 is of a shape having the upper arm supporting part 10 and the lower arm supporting part 11 which are vertically separated from each other at both left and right ends, and is of a so-called diagonal line shape or X shape, the opening 26 at both left and right ends of the front width direction member 2 is broadened. Thus, the panels can be sandwiched and provisionally joined deep into the center side in the vehicle width direction while inhibiting their mutual influence of heat or the like, and gaps in the welding portions in the intermediate body forming process can be reduced.

(Second Embodiment)

The foregoing embodiment explained a case of taking a sub-frame for FF as an example. However, the present invention is not limited thereto, and this invention can also be applied to a four-wheel drive (4WD) sub-frame.

Specifically, a sub-frame 101 as another embodiment of the sub-frame structure of a vehicle according to the present invention shown in FIGS. 11 to 15 configures a sub-frame for supporting the rear portion of the vehicle body of a four-wheel drive (4WD) automobile.

The sub-frame 101 comprises a pair of a front width direction member 102 and a rear width direction member 103, a pair of front-back direction members 104, 105 connected to the left and right ends thereof, a pair of connecting members 106, 107, and a pair of linking brackets 108, 109.

Moreover, the foregoing multilink suspension mechanism 50 (refer to FIG. 1) is supported with the sub-frame 101.

The front width direction member 102 is a member extending in the vehicle width direction D1, includes an upper arm supporting part 110 and a lower arm supporting part 111 which are vertically separated from each other at both left and right ends, and has an approximate X shape.

An inner end of the upper suspension arm 51 (refer to FIG. 1) is swingably supported vertically in an arm bearing hole 110a of the upper arm supporting part 110 with a bolt or the like. Meanwhile, an inner end of the lower suspension arm 52 (refer to FIG. 1) is swingably supported vertically in an arm bearing hole 111a of the lower arm supporting part 111 with a bolt or the like.

Note that, in the case of a sub-frame 101 for 4WD, a void part 102a is formed at the lower center part of the front width direction member 102 because a rear differential unit and a drive shaft for driving the rear wheels are disposed at the rear part of the vehicle body.

Figure 11:
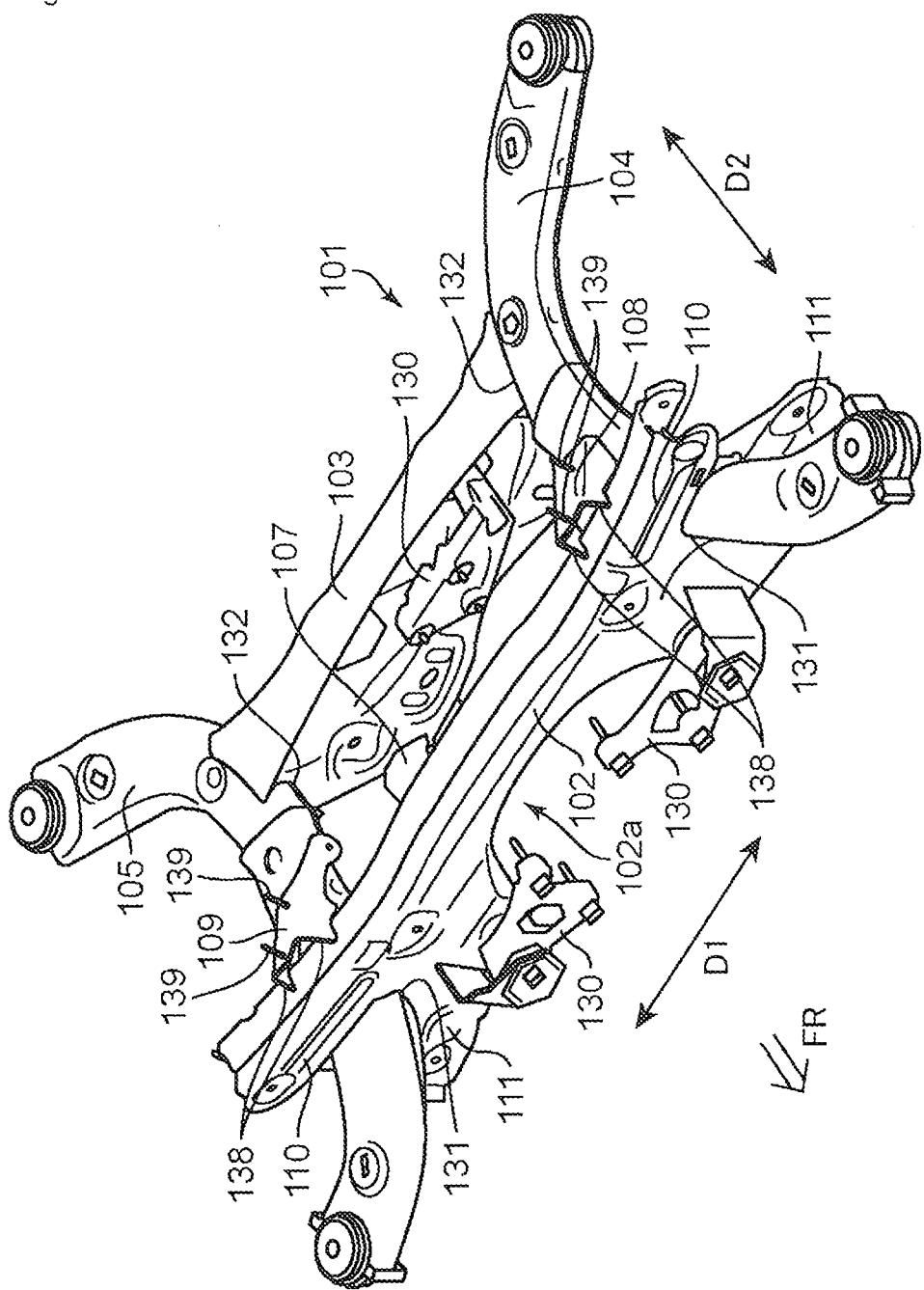
[FIG. 11]
Figure 12:
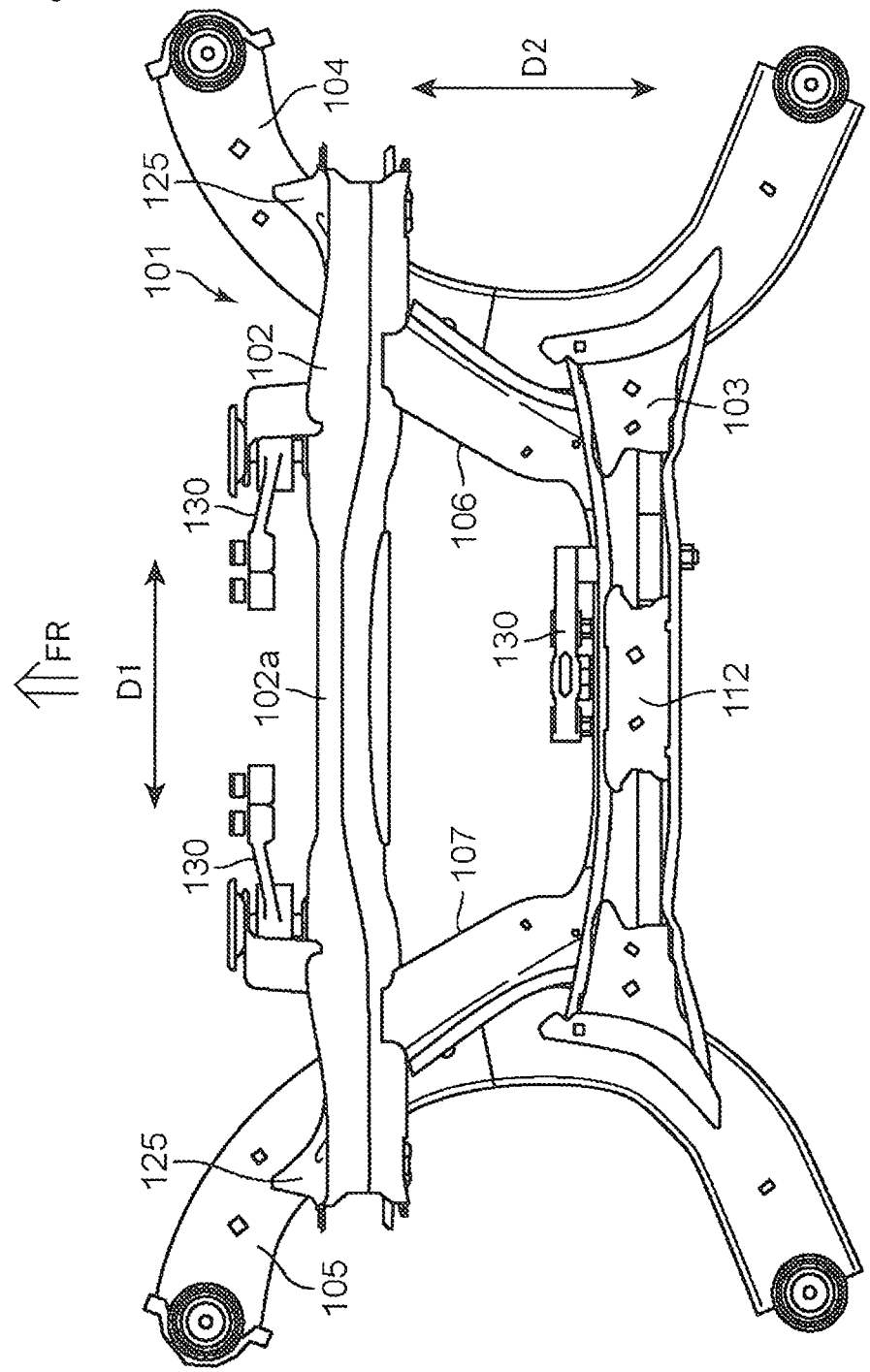
[FIG. 12]
Figure 13:
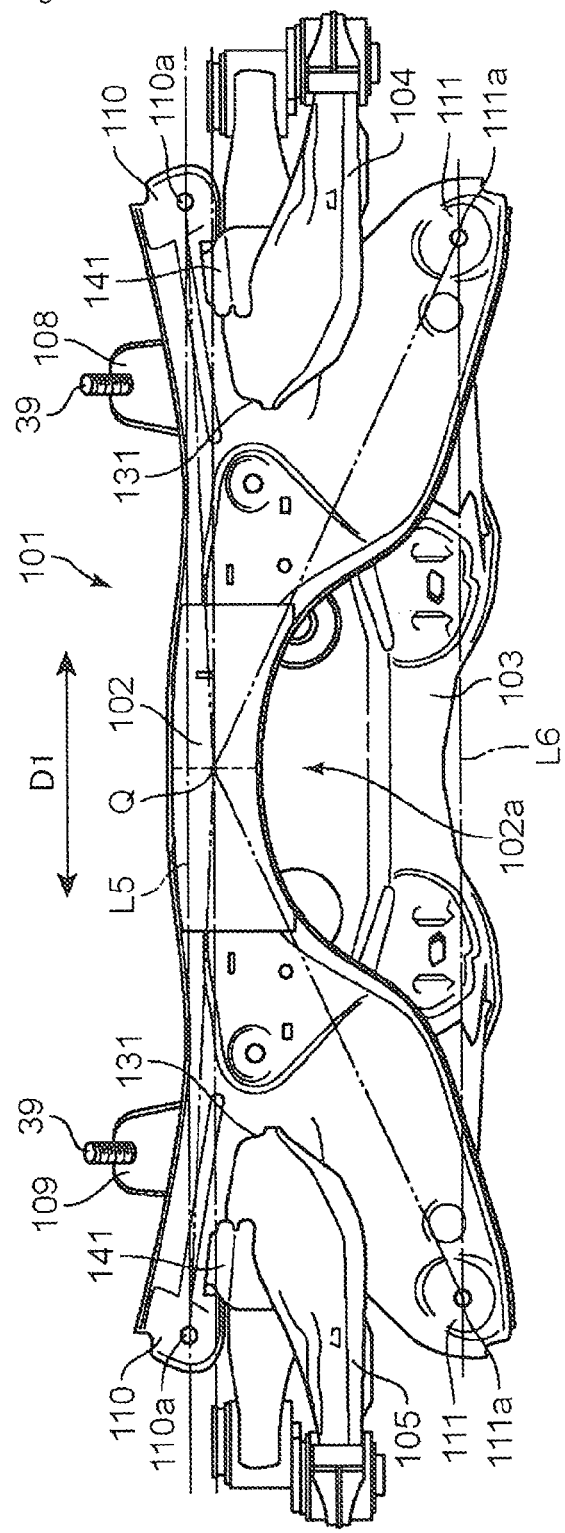
[FIG. 13]

Note that reference numeral 130 in FIGS. 11 and 12 shows the rear differential support bracket for supporting the rear-side differential unit. Moreover, reference numeral 125 in FIGS. 11 and 12 shows flange parts, which are configured the same as the flange parts 25 of the first embodiment.

The rear width direction member 103 is a member extending in the vehicle width direction D1, and is provided spaced from the front width direction member 102 in the vehicle front-back direction.

A pair of rear lower arms 53 (refer to FIG. 1) extending in the vehicle width direction D1 is swingably supported vertically by the rear width direction member 103 with a bolt or the like. Moreover, a reinforcement bracket 112 is welded near the center on the lower surface side of the rear width direction member 103.

The pair of front-back direction members 104, 105 are members extending in the vehicle front-back direction D2 (refer to FIG. 3) and mounted between the upper arm supporting part 110 and the lower arm supporting part 111 while respectively connecting left-side ends and right-side ends of the front width direction member 102 and the rear width direction member 103.

The front-back direction members 104, 105 are joined to the front width direction member 102 in a state of being inserted into a concave part 131 formed between the upper arm supporting part 110 and the lower arm supporting part 111 in the front width direction member 102, and is also joined to the rear width direction member 103 in a state of being inserted into a concave part 132 formed at either end of the rear width direction member 103.

Since the front-back direction members 104, 105 for 4WD are positioned more upward than the foregoing FF front-back direction members 4, 5 (refer to FIG. 1), the upper arm supporting part 110 is formed narrower than the upper arm supporting part 10 of FIG. 1 in order to assemble the front-back direction members 104, 105 from the side of the members 104, 105. Thus, for reinforcement, a reinforcement bracket 141 (refer to FIG. 13) is provided between the upper arm supporting part 110 and the upper parts of the front-back direction members 104, 105.

Note that the reinforcement brackets 141, 141 are joined with the top face of the front-back direction members 104, 105 and the outer side faces in the vehicle width direction Dl.

Figure 14:
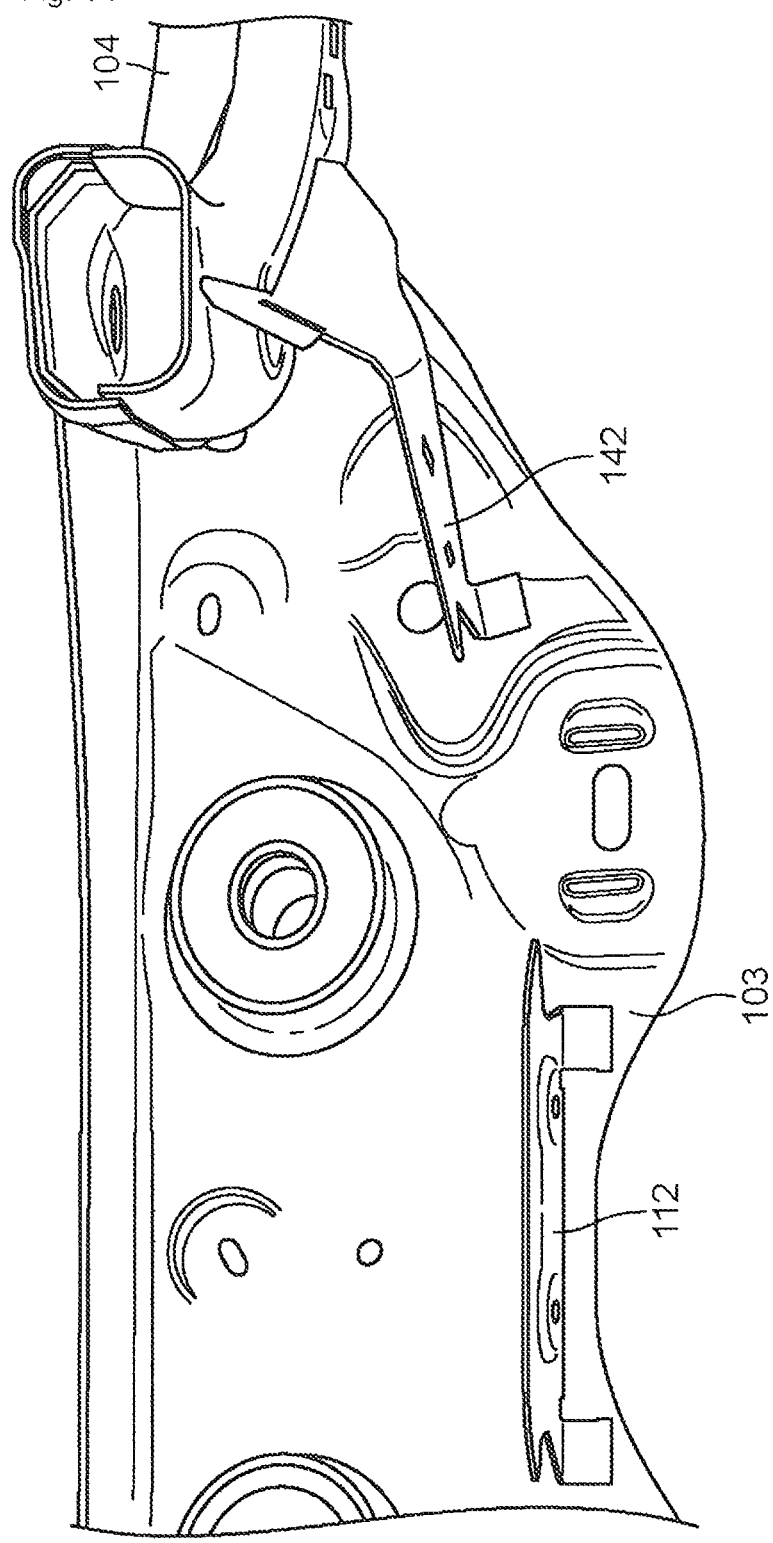
[FIG. 14]

Furthermore, as shown in FIG. 14, a reinforcement bracket 142 is provided between the lower parts of the front-back direction members 104, 105 and the rear width direction member 103.

Figure 15:
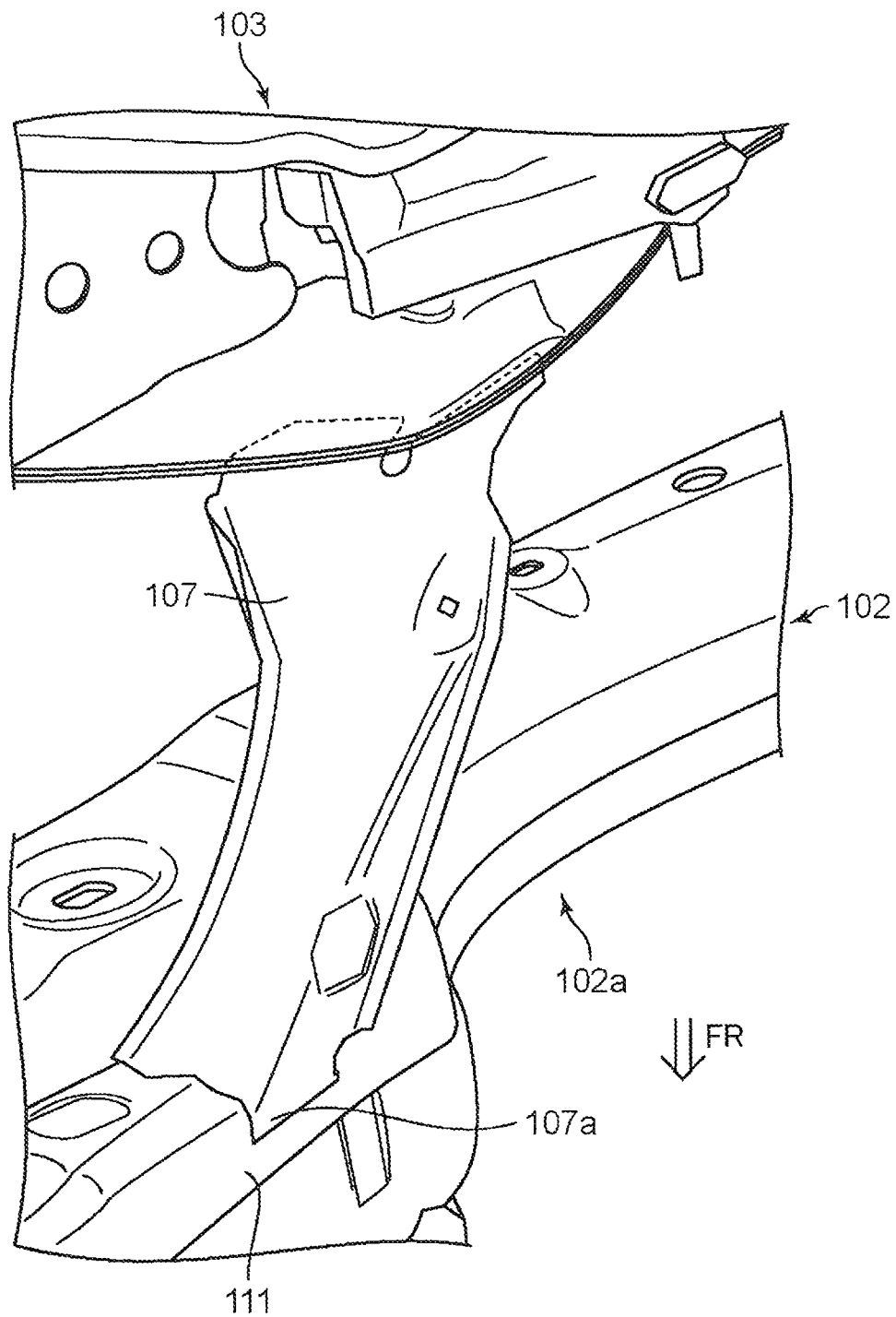
[FIG. 15]

Moreover, as shown in FIGS. 11, 12 and 15, a pair of connecting members 106, 107 link the lower arm supporting part 111 on the left and right sides in the front width direction member 102 with the vicinity of the left and right ends of the rear width direction member 103. Moreover, as shown in FIG. 15, since a flange part 107a of the connecting member 107 is joined with the lower face of the front width direction member 102, the rigidity in the front-back direction is further improved.

Although the front width direction member 102 and rear width direction member 103 are easily subject to a load at the bottom parts thereof, the rigidity in the front-back direction is improved since the bottom parts thereof are partially connected firmly with the pair of connecting members 106, 107.

Moreover, since the connecting members 106, 107 are disposed at a slant inwardly in the vehicle width direction when viewed in the vehicle width direction D1 of FIG. 12, the load when the automobile is turning can be effectively received at the lower part of the sub-frame 101 where the load is concentrated.

Furthermore, the pair of linking brackets 108, 109 respectively link the front-back direction member 104, 105 with the upper arm supporting part 110 of the front width direction member 102 or the vicinity portion thereof, or both the upper arm supporting part 110 and the vicinity portion thereof.

The linking brackets 108, 109 are members that are shorter and lighter than the connecting members 106, 107. The linking brackets 108, 109 diagonally link the short distance between the upper arm supporting part 110 and the front-back direction members 104, 105.

Moreover, a protrusion 138 is respectively formed at the front side of the linking brackets 108, 109. Thus, since the joining area will increase upon welding the linking brackets 108, 109 with the rear side of the front width direction member 102, the rigidity in the vehicle front-back direction is further improved.

Furthermore, the top face of the linking brackets 108, 109 is provided with a stud bolt 139 for mounting the bracket 36 (refer to FIG. 2) for fixing the stabilizer.

Even with the sub-frame 101 for 4WD shown in FIGS. 11 to 15, the vicinity of the lower arm supporting part 111 configuring the lower side of the front width direction member 102 where the load is concentrated is firmly connected to the rear width direction member 103 with connecting members 106, 107 in order to improve the rigidity in the front-back direction. In addition, the short distance (distance that is much shorter than the connecting members 106, 107) between the vicinity of the upper arm supporting part 110 configuring the upper side of the front width direction member 102 and the front-back direction members 104, 105 disposed the vicinity of the upper arm supporting part 110 which are relatively free from being subject to a load in comparison to the lower side is connected with the linking brackets 108, 109.

Consequently, it is possible to optimize the structure relative to the size of the load, and thereby improve the rigidity in the front-back direction and achieve weight saving.

Moreover, with the structure of supporting the upper side of the front width direction member 102 with the linking brackets 108, 109, the structure can be simplified, and weight saving and productivity can be improved.

Furthermore, even with the sub-frame 101 for 4WD, a cross section center Q in the center part of the vehicle width direction of the front width direction member 102 is provided between a line L5 passing through the upper-side left and right arm bearing holes 110a, 110a and a line L6 passing through the lower-side left and right arm bearing holes 111a, 111a, and, as a result of the cross section center Q and the respective arm bearing holes 110a, 111a being connected linearly (in other words, a linear connection that does not cross or circumvent the void part 102a and the like), it will be configured approximately diagonally, and the upper arm supporting part 110 and the lower arm supporting part 111 of the front width direction member 102 can thereby be disposed in a cross coupling (disposed in an X shape). Thus, the rigidity in the vehicle width direction D1 can be improved.

Moreover, since the sub-frame 101 for 4WD can also be manufactured with the same processes as the foregoing sub-frame 1 for FF (refer to FIG. 1), the production line can be easily shared.

(Third Embodiment)

With the sub-frame 101 for 4WD shown in FIGS. 11 to 15, the upper arm supporting part 110 of the front width direction member 102 is integrally formed with the other members. However, the present invention is not limited thereto, and it may be formed with a separate member.

Figure 16:
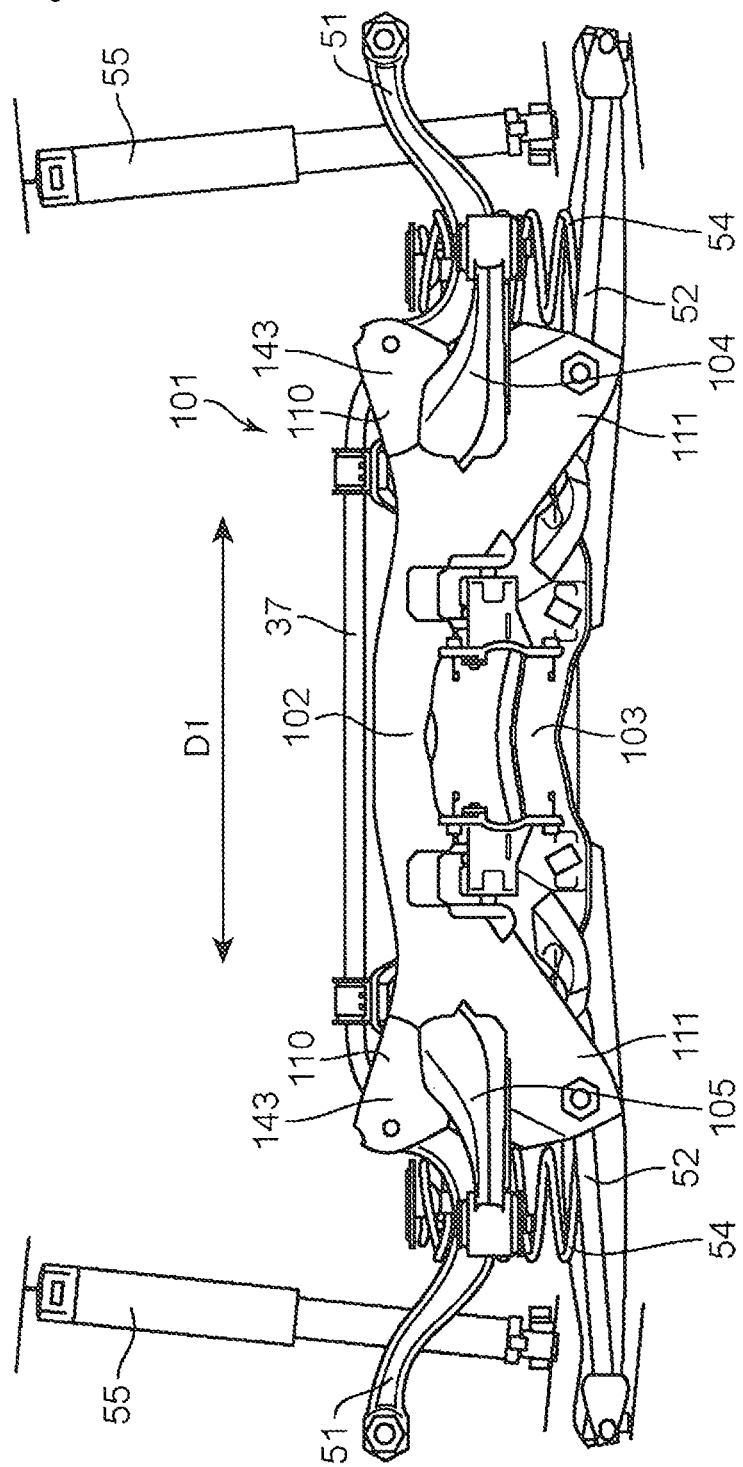
[FIG. 16]
Figure 17:
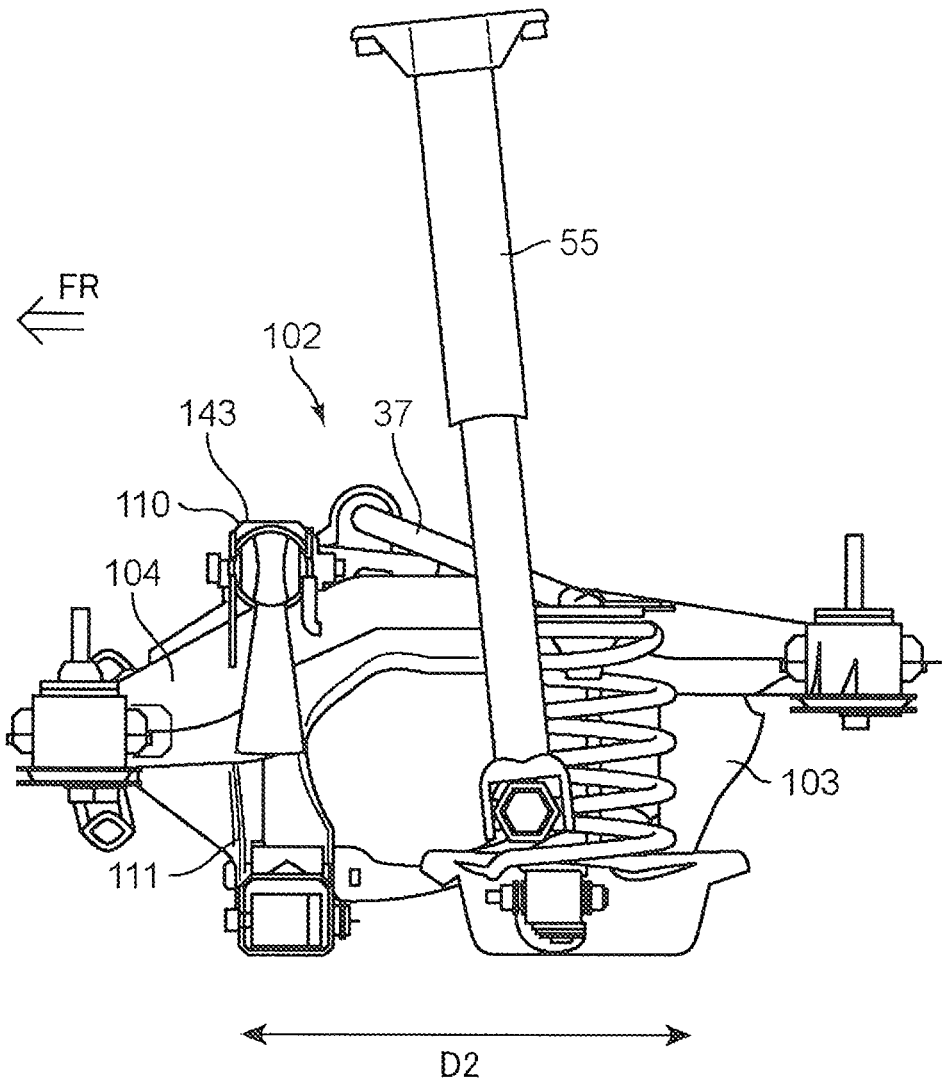
[FIG. 17]

Specifically, as shown in FIGS. 16 and 17, at least a part (all in the example of FIGS. 16 and 17) of the upper arm supporting part 110 of the front width direction member 102 is made of a member 143 that is separate from the other parts of the front width direction member 102, and is joined from a top surface of the front-back direction members 104, 105 toward the outside (side of the direction which the front-back direction members 104, 105 are mutually distant) in the vehicle width direction D1.

The member 143 configuring the upper arm supporting part 110 is welded subsequently to the other members of the front width direction member 102 and the front-back direction members 104, 105 after positioning the front-back direction members 104, 105 to predetermined positions on the left and right sides of the front width direction member 102.

According to the foregoing configuration, since the upper arm supporting part 110 can be disposed in a stacking manner with the front-back direction members 104, 105 in the vertical direction and the joining area with the front-back direction members 104, 105 can be improved, the torsion rigidity can be improved. The freedom of design can also be improved.

Finally, the configuration and effect of the foregoing embodiments are explained.

The sub-frame structure of a vehicle of the foregoing embodiments is a sub-frame structure of a vehicle for supporting a suspension arm of a multilink-type suspension, comprising: a first width direction member extending in a vehicle width direction and having an upper arm supporting part and a lower arm supporting part which are vertically separated from each other at both left and right ends; a second width direction member provided spaced from the first width direction member in a vehicle front-back direction and extending in the vehicle width direction; a pair of front-back direction members extending in the vehicle front-back direction and mounted between the upper arm supporting part and the lower arm supporting part while respectively connecting left-side ends and right-side ends of the first and second width direction members; at least one connecting member for connecting between at least one of the lower arm supporting part of the first width direction member or a vicinity portion thereof and the second width direction member; and a pair of linking parts for respectively linking between at least one of the upper arm supporting part of the first width direction member or a vicinity portion thereof and the pair of front-back direction members, the linking parts being spaced from the second width direction member forward in the vehicle front-back direction.

According to the foregoing configuration, the vicinity of the lower arm supporting part configuring the lower side of the first width direction member where the load is concentrated is firmly connected to the second width direction member with at least one connecting member in order to improve the rigidity in the front-back direction, and on the other hand, the vicinity of the upper arm supporting part configuring the upper side of the first width direction member and the front-back direction member disposed vicinity which are relatively free from being subject to a load in comparison to the lower side are connected with a linking part that is of a shorter distance than the connecting member.

Consequently, it is possible to optimize the structure relative to the size of the load, and thereby improve the rigidity in the front-back direction and achieve weight saving.

Moreover, with the sub-frame structure of a vehicle according to the foregoing embodiment, the first width direction member includes flange at least one part which bends and extends to an opposite side relative to the second width direction member at the lower arm supporting part, and which is joined with the front-back direction member.

According to the foregoing configuration, since the flange part can be used for supporting the front-back direction member, the rigidity of the first width direction member in the front-back direction can be further improved.

Moreover, with the sub-frame structure of a vehicle according to the foregoing embodiment, at least a part of the upper arm supporting part of the first width direction member is made of a member that is separate from other parts of the first width direction member, and is joined from a top surface of the front-back direction member toward the outside of the vehicle width direction.

According to the foregoing configuration, since the upper arm supporting part can be disposed in a stacking manner with the front-back direction member in the vertical direction and the joining area with the front-back direction member can be improved, the torsion rigidity can be improved. The freedom of design can also be improved.

Moreover, with the sub-frame structure of a vehicle according to the foregoing embodiment, the first width direction member has a structure of receiving a load approximately diagonally between its left-side upper arm supporting part and right-side lower arm supporting part, and receiving a load approximately diagonally between its right-side upper arm supporting part and left-side lower arm supporting part.

According to the foregoing configuration, since the left and right upper arm supporting part and lower arm supporting part are disposed approximately diagonally and the first width direction member is formed in a cross coupling shape, the rigidity of the vehicle width direction can be improved.

Moreover, with the sub-frame structure of a vehicle according to the foregoing embodiment, the connecting member is disposed at a slant inwardly in the vehicle width direction toward the second width direction member.

According to the foregoing configuration, since the connecting member is disposed at a slant inwardly in the vehicle width direction toward the second width direction member, the load when the automobile is turning can be effectively received at the lower part of the sub-frame where the load is concentrated.

Moreover, with the foregoing embodiment, the first width direction member includes at least one flange part which bends and extends to an opposite side relative to the second width direction member at the lower arm supporting part, and which is joined with the front-back direction member, and the flange part is slanted outwardly in the vehicle width direction.

According to the foregoing configuration, since the flange part is slanted outwardly in the vehicle width direction, the rigidity of the first width direction member against the load caused by the slant in the vehicle width direction can be effectively improved with lightweight and minimal parts.

Moreover, with the foregoing embodiment, each of the linking parts includes a stabilizer attaching part for attaching a stabilizer.

According to the foregoing configuration, since each of the linking parts includes a stabilizer attaching part, it is possible to reduce the number of parts, and achieve weight saving and downsizing.

Moreover, with the foregoing embodiment, a connecting region of the front-back direction member, where the front-back direction member is connected with the upper arm supporting part of the first width direction member, is slanted so that the second width direction member side is on the upper side when viewed from the side of the connecting region.

According to the foregoing configuration, since the height of the longitudinal wall on the second width direction member side in the first width direction member becomes shorter than the height of the longitudinal wall on the opposite side, the rigidity of the first width direction member relative to the slanting direction toward the second width direction member side can be improved. Since the connecting member is reinforced relative to the opposite slant (that is, slanting direction toward the side that is opposite to the second width direction member side of the first width direction member), consequently, the first width direction member becomes strong against the slant in both the front and back.

Moreover, with the foregoing embodiment, the first width direction member is formed in a closed cross section structure in which edges of a pair of opposing approximately U-shaped cross section panels are mutually joined, and which continues in the vehicle width direction from an end in the vehicle width direction toward a center side by a predetermined distance.

According to the foregoing configuration, since a flangeless structure that does not require a flange for joining the pair of approximately U-shaped cross section panels is adopted, the section modulus can be improved. In addition, since the first width direction member is of a shape having an upper arm supporting part and a lower arm supporting part which are vertically separated from each other at both left and right ends, and is of a so-called diagonal line shape or X shape, the opening at both left and right ends of the first width direction member is broadened. Thus, a bifacial joining jig for spot welding or friction stir welding can be easily inserted from the opening deep into the center side in the vehicle width direction.

Moreover, with the foregoing embodiment, one panel configuring the first width direction member is provided with a positioning projection for restricting the movement of another panel in an approaching direction, and the projection is disposed in the vicinity of the linking parts.

According to the foregoing configuration, the positioning projection provided to one panel configuring the first width direction member is also caused to efficiently contribute to the transfer of the front-back load to the linking part, and improvement in productivity and rigidity can be achieved simultaneously.

The method of manufacturing a sub-frame of a vehicle according to the foregoing embodiment is a method of manufacturing a sub-frame of a vehicle which includes: a first width direction member extending in a vehicle width direction and having an upper arm supporting part and a lower arm supporting part which are vertically separated from each other at both left and right ends; a second width direction member provided spaced from the first width direction member in a vehicle front-back direction and extending in the vehicle width direction; a pair of front-back direction members extending in the vehicle front-back direction and mounted between the upper arm supporting part and the lower arm supporting part while respectively connecting left-side ends and right-side ends of the first and second width direction members; at least one connecting member for connecting at least one of the lower arm supporting part of the first width direction member and a vicinity portion thereof and the second width direction member with a pair of linking parts for respectively linking at least one of the upper arm supporting part of the first width direction member and a vicinity portion thereof with the pair of front-back direction members, the first width direction member being formed in a closed cross section structure in which edges of a pair of opposing approximately U-shaped cross section panels are mutually joined, and which continues in the vehicle width direction from an end in the vehicle width direction toward a center side by a predetermined distance, the manufacturing method comprising: a provisional joining process of respectively positioning the pair of approximately U-shaped cross section panels configuring the first width direction member, a member configuring the second width direction member, and a member configuring the connecting member at predetermined positions, and provisionally joining the panels and members with one another; an intermediate body forming process of forming an intermediate body by mutually welding the pair of approximately U-shaped cross section panels configuring the first width direction member, the member configuring the second width direction member, and the member configuring the connecting member; and a collective welding process of positioning the front-back direction member and the linking parts at predetermined positions in the intermediate body, and collectively welding the front-back direction member, the linking parts and the intermediate body at the joining parts thereof.

According to the foregoing manufacturing method, since the pair of approximately U-shaped cross section panels configuring the first width direction member, the member configuring the second width direction member, and the member configuring the connecting member are respectively positioned at predetermined positions and provisionally joined in a mutual manner and subsequently mutually welded to form the intermediate body, and the front-back direction member and the connecting part are positioned at predetermined positions on the intermediate body, and the front-back direction member and the connecting part and the intermediate body are collectively welded at the joining parts thereof, it is possible to reduce the manufacture line and processes.

Moreover, with the manufacturing method according to the foregoing embodiment, in the provisional joining process, the first width direction member is positioned using at least one of holes formed on at least one of the upper arm supporting part and the lower arm supporting part of the first width direction member.

According to the foregoing manufacturing method, in the provisional joining process, since the arm bearing hole for supporting the suspension arm in the respective arm supporting parts of the first width direction member is used for positioning the first width direction member, reduction of holes for positioning the first width direction member and improvement in the measurement accuracy can be simultaneously achieved.

Moreover, with the manufacturing method according to the foregoing embodiment, in the provisional joining process, edges of the pair of approximately U-shaped cross section panels configuring the first width direction member are superposed and provisionally joined at a position distant from a portion that is welded in the intermediate body forming process.

According to the foregoing manufacturing method, since the first width direction member is of a shape having an upper arm supporting part and a lower arm supporting part which are vertically separated from each other at both left and right ends, and is of a so-called diagonal line shape or X shape, the opening at both left and right ends of the first width direction member is broadened. Thus, the panels can be sandwiched and provisionally joined deep into the center side in the vehicle width direction while inhibiting their mutual influence of heat or the like, and gaps in the welding portions in the intermediate body forming process can be reduced.

[Industrial Applicability]

The foregoing first to third embodiments explained a case taking an automobile as an example, but the present invention is not limited thereto, and the sub-frame structure of a vehicle according to the present invention can be broadly applied to body of vehicles other than automobiles so as long as it is a vehicle having a plurality of upper and lower suspension arms.

The invention claimed is:

1. A sub-frame structure of a vehicle for supporting a suspension arm of a multilink-type suspension, comprising:
    a first width direction member extending in a vehicle width direction and having an upper arm supporting part and a lower arm supporting part which are vertically separated from each other at both left and right ends;
    a second width direction member provided spaced from the first width direction member in a vehicle front-back direction and extending in the vehicle width direction;
    a pair of front-back direction members extending in the vehicle front-back direction and mounted between the upper arm supporting part and the lower arm supporting part while respectively connecting left-side ends and right-side ends of the first and second width direction members;
    at least one connecting member for connecting at least one of the lower arm supporting part of the first width direction member and a vicinity portion thereof with the second width direction member; and
    a pair of linking parts for respectively linking at least one of the upper arm supporting part of the first width direction member and a vicinity portion thereof with the pair of front-back direction members,
    the linking parts being spaced from the second width direction member forward in the vehicle front-back direction.

2. The sub-frame structure of a vehicle according to claim 1,
    wherein the first width direction member includes flange parts which bend and extend to an opposite side relative to the second width direction member at the lower arm supporting part, and which are joined with the front-back direction members.

3. The sub-frame structure of a vehicle according to claim 1,
    wherein at least a part of the upper arm supporting part of the first width direction member is made of a member that is separate from other parts of the first width direction member, and is joined from a top surface of the front-back direction member toward the outside of the vehicle width direction.

4. The sub-frame structure of a vehicle according to claim 1,
wherein the first width direction member has a structure of receiving a load approximately diagonally between its left-side upper arm supporting part and right-side lower arm supporting part, and receiving a load approximately diagonally between its right-side upper arm supporting part and left-side lower arm supporting part.

5. The sub-frame structure of a vehicle according to claim 1,
wherein the connecting member is disposed at a slant inwardly in the vehicle width direction toward the second width direction member.

6. The sub-frame structure of a vehicle according to claim 5,
wherein the first width direction member includes flange parts which bend and extend to an opposite side relative to the second width direction member at the lower arm supporting part, and which are joined with the front-back direction members, and
the flange parts are slanted outwardly in the vehicle width direction.

7. The sub-frame structure of a vehicle according to claim 1,
wherein inside portions of the linking parts in the vehicle width direction extends at a slant inwardly in the vehicle width direction from the first width direction member to the second width direction member.

8. The sub-frame structure of a vehicle according to claim 1,
wherein each of the linking parts includes a stabilizer attaching part for attaching a stabilizer.

9. The sub-frame structure of a vehicle according to claim 1,
wherein a connecting region, of the front-back direction member, where the front-back direction member is connected with the upper arm supporting part of the first width direction member, is slanted so that the second width direction member side is on the upper side when viewed from the side of the connecting region.

10. The sub-frame structure of a vehicle according to claim 1,
wherein the first width direction member is formed in a closed cross section structure in which edges of a pair of opposing approximately U-shaped cross section panels are mutually joined, and which continues in the vehicle width direction from an end in the vehicle width direction toward a center side by a predetermined distance.

11. The sub-frame structure of a vehicle according to claim 10,
wherein one panel configuring the first width direction member is provided with at least one positioning projection for restricting the movement of another panel in an approaching direction, and the projection is disposed in the vicinity of the linking parts.

12. A method of manufacturing a sub-frame of a vehicle which includes:
a first width direction member extending in a vehicle width direction and having an upper arm supporting part and a lower arm supporting part which are vertically separated from each other at both left and right ends;
a second width direction member provided spaced from the first width direction member in a vehicle front-back direction and extending in the vehicle width direction;
a pair of front-back direction members extending in the vehicle front-back direction and mounted between the upper arm supporting part and the lower arm supporting part while respectively connecting left-side ends and right-side ends of the first and second width direction members;
at least one connecting member for connecting at least one of the lower arm supporting part of the first width direction member and a vicinity portion thereof with the second width direction member; and
a pair of linking parts for respectively linking at least one of the upper arm supporting part of the first width direction member and a vicinity portion thereof with the pair of front-back direction members,
the first width direction member being formed in a closed cross section structure in which edges of a pair of opposing approximately U-shaped cross section panels are mutually joined, and which continues in the vehicle width direction from an end in the vehicle width direction toward a center side by a predetermined distance,
the manufacturing method comprising:
a provisional joining process of respectively positioning the pair of approximately U-shaped cross section panels configuring the first width direction member, a member configuring the second width direction member, and a member configuring the connecting member at predetermined positions, and provisionally joining the panels and members with one another;
an intermediate body forming process of forming an intermediate body by mutually welding the pair of approximately U-shaped cross section panels configuring the first width direction member, the member configuring the second width direction member, and the member configuring the connecting member; and
a collective welding process of positioning the front-back direction member and the linking parts at predetermined positions on the intermediate body, and collectively welding the front-back direction member, the linking parts and the intermediate body at the joining parts thereof.

13. The manufacturing method according to claim 12,
wherein, in the provisional joining process, the first width direction member is positioned using at least one of holes formed on at least one of the upper arm supporting part and the lower arm supporting part of the first width direction member.

14. The manufacturing method according to claim 12,
wherein, in the provisional joining process, edges of the pair of approximately U-shaped cross section panels configuring the first width direction member are superposed and provisionally joined at a position distant from a portion that is welded in the intermediate body forming process.

* * * * *